(12) United States Patent
Yamamoto et al.

(10) Patent No.: US 7,843,625 B2
(45) Date of Patent: Nov. 30, 2010

(54) SHEET FOR ELECTROPHORETIC DISPLAY DEVICES, PROCESS FOR ITS PRODUCTION, AND ITS APPLICATIONS

(75) Inventors: Hitoshi Yamamoto, Chino (JP); Harunobu Komatsu, Matsumoto (JP); Hironobu Akutagawa, Suita (JP); Yuji Misawa, Suita (JP)

(73) Assignees: Seiko Epson Corporation, Tokyo (JP); Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 12/222,999

(22) Filed: Aug. 21, 2008

(65) Prior Publication Data

US 2009/0059349 A1 Mar. 5, 2009

(30) Foreign Application Priority Data

Aug. 27, 2007 (JP) ............................. 2007-220318

(51) Int. Cl.
*G02B 26/00* (2006.01)
(52) U.S. Cl. ........................................ 359/296; 359/290
(58) Field of Classification Search ......... 359/290–291, 359/295–298, 316, 254; 345/107; 430/31–32; 349/86, 89
See application file for complete search history.

(56) References Cited

U.S. PATENT DOCUMENTS

| | | | | |
|---|---|---|---|---|
| 5,039,720 | A | * | 8/1991 | Saatweber et al. .......... 523/404 |
| 6,392,786 | B1 | * | 5/2002 | Albert ........................ 359/296 |
| 6,417,297 | B1 | | 7/2002 | Mayer et al. |
| 7,279,121 | B2 | | 10/2007 | Hayashi |
| 7,365,900 | B2 | | 4/2008 | Yamamoto |
| 2004/0012106 | A1 | | 1/2004 | Kanbe et al. |
| 2007/0009739 | A1 | | 1/2007 | Kanbe et al. |
| 2007/0097489 | A1 | * | 5/2007 | Doshi et al. ................. 359/296 |

(Continued)

FOREIGN PATENT DOCUMENTS

EP 0 723 975 7/1996

(Continued)

OTHER PUBLICATIONS

Japanese Office Action dated Mar. 31, 2009 in connection with JP 2007-220318 corresponding to the present U.S. application.

(Continued)

*Primary Examiner*—Jessica T Stultz
*Assistant Examiner*—Mahidere S Sahle
(74) *Attorney, Agent, or Firm*—Wenderoth, Lind & Ponack, L.L.P.

(57) ABSTRACT

The sheet for electrophoretic display devices includes a data display layer between electrically conductive layers of two opposite electrode films, the data display layer containing microcapsules for electrophoretic display devices and a binder resin, wherein the binder resin has a weight-average molecular weight of from 40,000 to 300,000 and a glass transition temperature of from −50° C. to 10° C. This sheet can be produced by forming the data display layer on an electrically conductive layer of a first electrode film and putting an electrically conductive layer of a second electrode film on the data display layer, followed by lamination. This sheet can be used, as its applications, for electrophoretic display devices using the sheets for electrophoretic display devices, and electronic equipments using the electrophoretic display devices.

11 Claims, 3 Drawing Sheets

U.S. PATENT DOCUMENTS

| | | |
|---|---|---|
| 2007/0297038 A1 * | 12/2007 | Chopra et al. ............... 359/296 |
| 2007/0298337 A1 | 12/2007 | Hayashi |
| 2008/0158651 A1 | 7/2008 | Kawase et al. |
| 2008/0204855 A1 | 8/2008 | Yamamoto |
| 2009/0127728 A1 | 5/2009 | Kanbe et al. |

FOREIGN PATENT DOCUMENTS

| | | |
|---|---|---|
| JP | 50-15115 | 6/1975 |
| JP | 2-119977 | 5/1990 |
| JP | 2551783 | 8/1996 |
| JP | 8-239539 | 9/1996 |
| JP | 11-052349 | 2/1999 |
| JP | 2001-055405 | 2/2001 |
| JP | 2002-526812 | 8/2002 |
| JP | 2004-102235 | 4/2004 |
| JP | 2005-70567 | 3/2005 |
| JP | 2005-84267 | 3/2005 |
| JP | 2005-169248 | 6/2005 |
| JP | 2005-345738 | 12/2005 |
| JP | 2006-258981 | 9/2006 |
| JP | 2007-131658 | 5/2007 |
| JP | 2007-192945 | 8/2007 |
| JP | 2007-213014 | 8/2007 |
| JP | 2007-219503 | 8/2007 |
| JP | 2008-058542 | 3/2008 |
| JP | 2008-107484 | 5/2008 |
| JP | 2008-116513 | 5/2008 |
| JP | 2008-209526 | 9/2008 |
| JP | 2008-241806 | 10/2008 |
| WO | 00/20922 | 4/2000 |

OTHER PUBLICATIONS

Notice of Reasons of Rejection (with English translation) issued Sep. 1, 2009 in Japanese Application No. 2007-220318.

Notice of Reasons of Rejection (with English translation) issued Jul. 28, 2009 in Japanese Application No. 2007-229337.

* cited by examiner

SHEET FOR ELECTROPHORETIC DISPLAY DEVICES, PROCESS FOR ITS PRODUCTION, AND ITS APPLICATIONS

BACKGROUND OF THE INVENTION

1. Field of the Invention

The present invention relates to a sheet for electrophoretic display devices, a process for its production, and its applications. More specifically, the present invention relates to a sheet for electrophoretic display devices and a process for its production, as well as, electrophoretic display devices obtained using the sheets for electrophoretic display devices, and electronic equipments obtained using the electrophoretic display devices.

2. Description of the Related Art

An electrophoretic display device displays character data, image data, and the like, by the behavior of electrophoretic particles, for example, when a voltage is applied to a dispersion in which the electrophoretic particles are dispersed in a solvent. For example, if the electrophoretic particles and the solvent are colored with different colors, the color of the electrophoretic particles is observed when the electrophoretic particles are moved to the surface of the solvent by voltage application, and the color of the dispersion is observed when the electrophoretic particles are moved to the bottom of the solvent. If electrodes are provided to which voltage application is made possible by address appointment, different colors for the respective addresses can be displayed, and accordingly, arbitrary character data and image data can be displayed. Moreover, it is possible to rewrite the display data, and at the same time, it is advantageous that the display data can be maintained as it is, even if there is no electric signal.

In recent years, in place of the conventional electrophoretic display devices (e.g., see Japanese Patent Publication No. Sho 50-15115) in which a dispersion of electrophoretic particles are enclosed in spaces between opposed electrode substrates, there have been developed microcapsule type electrophoretic display devices (e.g., see Japanese Patent No. 2551783) with a structure in which microcapsules enclosing a dispersion of electrophoretic particles are arranged between opposed electrode substrates. As compared with the conventional electrophoretic display devices, the microcapsule type electrophoretic display devices are remarkably improved in various performances and functions, such as long-term stability of display, responsiveness, contrast, and display rewritable times.

For the electrophoretic display devices, there have also been proposed, besides fixed equipments such as ordinary displays, techniques of flexible displays, which have the shape of a thin sheet, which are ultraportable, and which can freely be inflected, such as electronic papers and electronic books.

In such electrophoretic display devices, there has been proposed a technique of making a dispersion of electrophoretic particles, i.e., a dispersion for electrophoretic display devices, into microcapsules (e.g., see Japanese Patent Laid-open Publication No. 2002-526812). A flexible sheet-shaped electrophoretic display device can easily be produced by enclosing a dispersion for electrophoretic display devices in microsphere-shaped microcapsules made of a transparent resin or the like and allowing the thus obtained microcapsules for electrophoretic display devices to be supported on the surface of an electrode film. There occurs neither uneven local distribution nor movement of a dispersion for electrophoretic display devices by making the dispersion for electrophoretic display devices into microcapsules, resulting in a technique also suitable for various applications in which electronic equipments may variously change their positions or may be inflected when used, such as electronic papers.

A flexible sheet-shaped electrophoretic display device is produced, for example, by applying a coating solution containing microcapsules for electrophoretic display devices and a binder resin to an electrode film, thereby forming a data display layer on an electrically conductive layer of one electrode film, and subsequently attaching the other electrode film onto the data display layer. At that time, the microcapsules are arranged on the electrode film without any gaps in the in-plane direction and without any stacking in the thickness direction, to thereby obtain higher contrast.

As a method of arranging microcapsules on an electrode film without any gaps in the in-plane direction and without any stacking in the thickness direction, there have been studied, for example, a method of applying a coating solution containing microcapsules and a binder resin on an electrode film, and subsequently allowing the microcapsules on the electrode film to move in a specified direction for gathering (e.g., see Japanese Patent Laid-open Publication No. 2005-70567), and a method of applying a coating solution containing microcapsules and a binder resin on an electrode film, and subsequently applying the coating solution again to fill the gaps between the microcapsules on the electrode film (e.g., see Japanese Patent Laid-open Publication No. 2005-84267).

In the heretofore known methods as described above, however, even if the microcapsules on the electrode film are allowed to move in a specified direction for gathering or a coating solution is applied again to fill the gaps between the microcapsules on the electrode film, the stacking of the microcapsules in the thickness direction cannot necessarily be suppressed to a satisfactory extent, and therefore, there have been some cases where high contrast cannot be obtained. In addition, even if high initial contrast can be obtained, the variation of contrast with time is great, and therefore, there have been some cases where practical utility is deteriorated.

SUMMARY OF THE INVENTION

Under the above-described circumstances, it is an object of the present invention to provide a sheet for electrophoretic display devices, exhibiting high initial contrast and showing a small variation of contrast with time, and a process for its production, as well as electrophoretic display devices obtained using the sheet for electrophoretic display devices, and electronic equipments obtained using the electrophoretic display devices.

The present inventors have made various studies, and as a result, they have found that the use of a binder resin having a relatively low molecular weight and a glass transition temperature in a specified range makes it possible to need no step of arranging microcapsules in a single layer at the time of forming a data display layer and to allow the microcapsules to move in the data display layer for arrangement in a substantially single layer at the time of lamination, thereby obtaining a sheet for electrophoretic display devices, exhibiting a high initial contrast and showing a small variation of contrast with time, in an easy and simple manner with high efficiency. Thus, the present invention has been completed.

That is, the present invention provides a sheet for electrophoretic display devices, comprising a data display layer between electrically conductive layers of two opposite electrode films, the data display layer containing microcapsules for electrophoretic display devices and a binder resin, wherein the binder resin has a weight-average molecular weight of from 40,000 to 300,000 and a glass transition temperature of from −50° C. to 10° C.

In the sheet for electrophoretic display devices according to the present invention, the binder resin may preferably comprise a hydroxy group-containing polymer. In addition, the binder resin may preferably have a hydroxy group value of from 0 mg KOH/g to 400 mg KOH/g. Further, the binder resin may preferably comprise a (meth)acrylic resin.

The present invention further provides a process for producing a sheet for electrophoretic display devices according to the present invention, comprising:

forming a data display layer on an electrically conductive layer of a first electrode film, the data display layer containing microcapsules for electrophoretic display devices and a binder resin, wherein the binder resin has a weight-average molecular weight of from 40,000 to 300,000 and a glass transition temperature of from −50° C. to 10° C.; and putting an electrically conductive layer of a second electrode film on the data display layer, followed by lamination.

In the process for producing a sheet for electrophoretic display devices according to the present invention, the lamination may preferably be carried out by application of a pressure in a range of from 0.1 MPa to 4 MPa.

The present invention further provides an electrophoretic display device comprising a data displaying part, wherein the data displaying part may comprise the above-described sheet for electrophoretic display devices.

The present invention further provides an electronic equipment comprising a data displaying means, wherein the data displaying means may comprise the above-described electrophoretic display device.

The sheet for electrophoretic display devices according to the present invention can exhibit a high initial contrast and can show a small variation of contrast with time because of its using a binder resin having a relatively low molecular weight and a glass transition temperature in a specified range. The process for producing a sheet for electrophoretic display devices according to the present invention needs no step of arranging microcapsules in a single layer at the time of forming a data display layer and can arrange the microcapsules in a substantially single layer without destroying the microcapsules at the time of lamination, and therefore, the conditions for applying a coating solution at the time of forming a data display layer can be set within a wide range, so that workability and productivity can be improved, and at the same time, a sheet for electrophoretic display devices, exhibiting a high initial contrast and showing a small variation of contrast with time, can be produced in an easy and simple manner with high efficiency. The electrophoretic display devices and electronic equipments according to the present invention not only can exhibit excellent display performance such as initial contrast but also can keep excellent display performance, even when allowed to stand at ordinary temperatures for a long time (e.g., for 30 days under an environment at 20° C. and 60% RH), because of their using the above-described sheet for electrophoretic display devices.

The sheet for electrophoretic display devices according to the present invention has the advantage that it exhibits high initial contrast and it shows a small variation of contrast with time. In addition, the production process of the present invention improves workability and productivity, as well as makes it possible to produce such a sheet for electrophoretic display devices in an easy and simple manner with high efficiency. Further, the sheet for electrophoretic display devices according to the present invention is useful for producing electrophoretic display devices and electronic equipments, both of which can exhibit high display performance. Therefore, the sheet for electrophoretic display devices, its production process and its applications, all of which are provided by the present invention, make a great contribution in various fields related to electronic equipments each having a data displaying means as a set of techniques for providing a data displaying means with extremely excellent display quality.

DETAILED DESCRIPTION OF THE PREFERRED EMBODIMENTS

<<Sheet for Electrophoretic Display Devices>>

Figure 1:
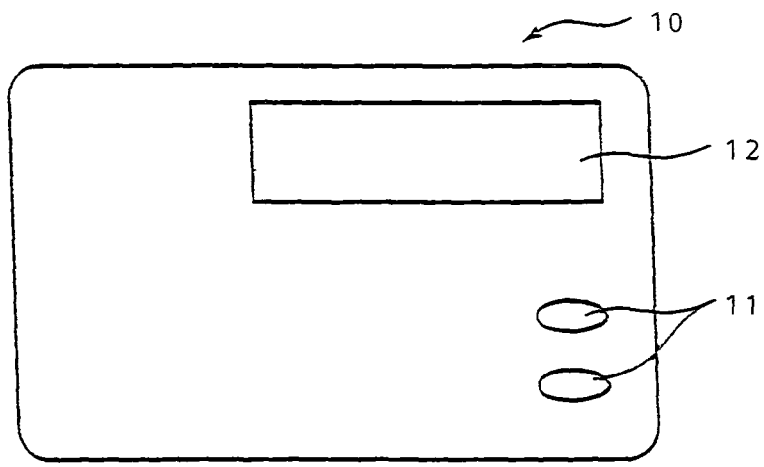
FIG. 1 is a plan view showing one example of an IC card which is one embodiment of the electronic equipment of the present invention.

The sheet for electrophoretic display devices according to the present invention (hereinafter sometimes referred to as "the display sheet of the present invention" or simply "display sheet") comprises a data display layer between electrically conductive layers of two electrode films, the data display layer containing microcapsules for electrophoretic display devices (hereinafter sometimes referred to as simply the "microcapsules") and a binder resin, wherein the binder resin has a weight-average molecular weight of from 40,000 to 300,000 and a glass transition temperature of from −50° C. to 10° C.

The following will describe in detail the display sheet of the present invention. However, the display sheet of the present invention is not restricted to the following descriptions, and besides the following exemplified matter, it can be put into practice after appropriate modifications or variations within such a range that the gists of the present invention are not adversely affected.

<Binder Resin>

In the display sheet of the present invention, the binder resin has a weight-average molecular weight of from 40,000 to 300,000 and a glass transition temperature of from −50° C. to 10° C.

In ordinary cases, when an electrophoretic display device is produced, it seems that, if all electrophoretic particles contained in each of the microcapsules in the data display layer can cause electrophoresis in the same manner in the display part, contrast can be improved. Therefore, for the purpose of obtaining high contrast, it requires that a data display layer containing the microcapsules and a binder resin should be formed so that the microcapsules can be arranged in a single layer to the greatest possible extent.

In the case where a high molecular weight polymer having a weight-average molecular weight of higher than 1,000,000 is used in the binder resin, even if the pressure and/or temperature of lamination are increased to such an extent that the microcapsules are not destroyed at a step of attaching an electrically conductive layer of the other electrode film on the data display layer for lamination, the microcapsules cannot almost move from a state that a coating solution has been applied and dried on the electrically conductive layer of one electrode film, and therefore, the microcapsules may remain stacked in the thickness direction, thereby making it difficult to obtain high contrast. In addition, in the case where a binder resin composed of a high molecular weight polymer is used, when a data display layer is formed by applying a coating solution on the electrically conductive layer of one electrode film, followed by drying, it requires to make some kinds of efforts to arrange the microcapsules in a single layer to the greatest possible extent, and therefore, there have been some problems that workability and productivity may be deteriorated when the data display layer is formed.

According to the present inventors' studies, in the case where a binder resin is used having a relatively low molecular weight and a glass transition temperature in a specified range, when a data display layer containing the microcapsules and the binder resin is formed on the electrically conductive layer of one electrode film and which the electrically conductive layer of the other electrode film is attached thereon, followed by lamination, the microcapsules can become allowed to move in the data display layer, and even if there makes no efforts to arrange the microcapsules in a single layer to the greatest possible extent when a coating solution is applied to the electrically conductive layer of one electrode film, followed by drying, to form a data display layer, the microcapsules can become arranged in a substantially single layer between the electrically conductive layers of two opposite electrode films without destroying the microcapsules at the time of the above-described lamination. This makes it possible to set the conditions for applying a coating solution at the time of forming a data display layer within a wide range, so that workability and productivity can be improved, and at the same time, sheets for electrophoretic display devices, exhibiting a high initial contrast and showing a small variation of contrast with time, can be produced in an easy and simple manner with high efficiency.

The weight-average molecular weight of a binder resin may usually have a lower limit of 40,000, preferably 45,000, and more preferably 50,000, and may usually have an upper limit of 300,000, preferably 250,000, and more preferably 200,000. If the binder resin has a weight-average molecular weight of lower than 40,000, the adhesiveness between the electrode films and the data display layer may become decreased. To the contrary, if the binder resin has a weight-average molecular weight of higher than 300,000, the microcapsules may be difficult to move in the data display layer at the time of lamination, and therefore, it may become difficult to arrange the microcapsules in a substantially single layer, resulting in a decrease in contrast. In this connection, the weight-average molecular weight of a binder resin is a value obtained by measurement by the method described below in Examples.

The glass transition temperature of a binder resin may usually have a lower limit of −50° C., preferably −45° C., and more preferably −40° C., and may preferably have an upper limit of 10° C., preferably 5° C., and more preferably 0° C. If the binder resin has a glass transition temperature of lower than −50° C., the adhesiveness between the electrode films and the data display layer may become decreased. To the contrary, if the binder resin has a glass transition temperature of higher than 10° C., the microcapsules may be difficult to move in the data display layer at the time of lamination, and therefore, it may become difficult to arrange the microcapsules in a substantially single layer, resulting in a decrease in contrast. In this connection, the glass transition temperature of a binder resin is a value obtained by measurement by the method described below in Examples.

The binder resin may preferably be a polymer having hydroxy groups. When a polymer having hydroxy groups is used as the binder resin, the affinity between the microcapsules and the electrically conductive layer of the electrode film becomes high, and a more uniform coated film can be formed when coating of a coating solution on the electrically conductive layer of the electrode film. The hydroxy group value of a binder resin may preferably have a lower limit of 0 mg KOH/g, more preferably 25 mg KOH/g, and still more preferably 50 mg KOH/g, and may preferably have an upper limit of 400 mg KOH/g, more preferably 380 mg KOH/g, and still more preferably 350 mg KOH/g. When the hydroxy group value of a binder resin is higher than 400 mg KOH/g, the moisture-absorption characteristics of the binder resin may become high, so that a change in contrast with time may become great. In this connection, the hydroxy group value of a binder resin is a value obtained by measurement by the method described below in Examples.

The binder resin is not particularly limited, so long as it has a weight-average molecular weight of from 40,000 to 300,000 and a glass transition temperature of from −50° C. to 10° C. Examples of the binder resin may include synthetic resin binders such as (meth)acrylic resins, (meth)acrylic urethane resins, polyvinyl chloride resins, polyvinyllidene chloride resins, melamine resins, urethane resins, styrene resins, alkyd resins, phenol resins, epoxy resins, polyester resins, polyvinyl alcohol resins, (meth)acrylic silicone resins, alkyl polysiloxane resins, silicone resins, silicone alkyd resins, silicone urethane resins, and silicone polyester resins; natural rubber or synthetic rubber binders such as ethylene-propylene copolymer rubbers, polybutadiene rubbers, styrene-butadiene rubbers, and acrylonitrile-butadiene copolymer rubbers; and thermoplastic or thermosetting polymer binders such as cellulose nitrate, cellulose acetate butylate, cellulose acetate, ethyl cellulose, hydroxypropylmethyl cellulose, and hydroxyethyl cellulose. The synthetic resin binders may be either of thermoplastic resins or hardenable resins such as thermosetting resins, moisture curable resins, ultraviolet curable resins, and electron beam curable resins. These binder resins may be used alone, or two or more of these binder resins may also be used in combination. In these binder resins, (meth)acrylic resins, polyester resins, and urethane resins may be preferred, and (meth)acrylic resins may particularly be preferred, in that they have relatable favorable dispersibility of the microcapsules and excellent adhesiveness to the electrode films and the data display layer.

When the binder resin is a (meth)acrylic resin, copolymerizable unsaturated monomers which can be used are not particularly limited, examples of which may include carboxyl group-containing unsaturated monomers such as (meth)acrylic acid, crotonic acid, itaconic acid, maleic acid, and maleic anhydride; sulfonic acid group-containing unsaturated monomers such as vinyl sulfonic acid, styrene sulfonic acid, and sulfoethyl (meth)acrylate; acid phosphate unsaturated monomers such as 2-(meth)acryloyloxyethyl acid phosphate, 2-(meth)acryloyloxypropyl acid phosphate, 2-(meth)acryloyloxy-3-chloropropyl acid phosphate, and 2-methacyloyloxyethylphenyl phosphoric acid; hydroxy group-containing unsaturated monomers such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, methyl (α-hydroxymethyl) acrylate, ethyl (α-hydroxymethyl)acrylate, caprolactone-modified hydroxyacrylate (trade name: PLACCEL F Series, available from Daicel Chemical Industries Ltd.), caprolactone-modified hydroxymethacrylate (trade name: PLACCEL FM Series, available from Daicel Chemical Industries Ltd.), and 4-hydroxymethylcyclohexylmethyl (meth)acrylate; (meth)acrylates such as methyl (meth)acrylate, ethyl (meth) acrylate, propyl (meth)acrylate, isopropyl (meth)acrylate, butyl (meth)acrylate, isobutyl (meth)acrylate, t-butyl (meth) acrylate, pentyl (meth)acrylate, 2-ethylhexyl (meth)acrylate, octyl (meth)acrylate, lauryl (meth)acrylate, stearyl (meth) acrylate, cyclopropyl (meth)acrylate, cyclopentyl (meth) acrylate, cyclohexyl (meth)acrylate, cycloheptyl (meth)acrylate, cyclooctyl (meth)acrylate, phenyl (meth)acrylate, benzyl (meth)acrylate, tolyl (meth)acrylate, xylyl (meth) acrylate, and phenethyl (meth)acrylate; epoxy group-containing unsaturated monomers such as glycidyl (meth)acrylate; nitrogen-containing unsaturated monomers such as (meth)acrylamide, N,N-di-methylaminoethyl (meth)acrylate, N,N-diethylaminoethyl (meth)acrylate, N,N-dimethylaminopropylacrylamide, N-isopropylacrylamide, t-butylacrylamide, methylenebis(meth)acrylamide, diacetoneacrylamide, N-methoxymethylacrylamide, N-ethoxylmethylacrylamide, N-butoxymethylacrylamide, N-methylol(meth)acrylamide, N-methyl-N-vinylformamide, dimethylaminoethyl methacrylate sulfate, N-vinylpyridine, N-vinylimidazole, N-vinylpyrrole, N-vinylpyrrolidone, N-phenylmaleimide, N-cyclohexylmaleimide, and 2-isopropenyl-2-oxazoline; silicon-containing unsaturated monomers such as vinyltrichlorosilane, vinyltris(β-methoxyethoxy)silane, vinyltrimethoxysilane, vinyltriethoxysilane, γ-methacryloxypropyltrimethoxysilane, and trimethylsiloxymethyl methacrylate; unsaturated monomers having two polymerizable double bonds, such as ethylene glycol di(meth)acrylate; halogen-containing unsaturated monomers such as trifluoroethyl (meth)acrylate, tetrafluoropropyl (meth)acrylate, octafluoropentyl (meth)acrylate, heptadodecafluorodecyl acrylate, perfluorooctylethyl (meth)acrylate, and hexafluoropropyl methacrylate; aromatic unsaturated monomers such as styrene, α-methylstyrene, and vinyltoluene; vinyl esters such as vinyl acetate; vinyl ethers such as vinyl methyl ether, vinyl ethyl ether, vinyl isopropyl ether, vinyl n-propyl ether, vinyl isobutyl ether, vinyl n-butyl ether, vinyl n-amyl ether, vinyl isoamyl ether, vinyl 2-ethylhexyl ether, vinyl n-octadecyl ether, cyanomethyl vinyl ether, 2,2-dimethylaminoethyl vinyl ether, 2-chloroethyl vinyl ether, benzyl vinyl ether, and phenyl vinyl ether; unsaturated cyan compounds such as (meth)acrylonitrile. These unsaturated monomers may be used alone, or two or more of these unsaturated monomers may also be used in combination.

A method of copolymerizing a monomer composition containing the above-described unsaturated monomers is not particularly limited, but copolymerization may be carried out by appropriately setting the polymerization conditions using a polymerization method such as solution polymerization, dispersion polymerization, suspension polymerization, or emulsion polymerization. There may also appropriately be set the presence or absence, and use amounts, of an additive(s) such as a polymerization initiator(s), a polymerization inhibitor(s), and a reducing agent(s), as well as a solvent(s).

The solvent which can be used when the polymer composition is copolymerized using a solution polymerization method is not particularly limited, examples of which may include organic solvents and water, the organic solvents including aromatic solvents such as toluene, xylene, and others; alcohol solvents such as ethyl alcohol, isopropyl alcohol, n-butyl alcohol, isobutyl alcohol, propylene glycol methyl ether, and dipropylene glycol methyl ether; ester solvents such as butyl acetate, ethyl acetate, cellosolve acetate, and propylene glycol methyl ether acetate; ketone solvents such as acetone, methyl ethyl ketone, and methyl isobutyl ketone; dimethylformamide; and alkylene glycol monoalkyl ether solvents such as ethylene glycol monomethyl ether, diethylene glycol monomethyl ether, and propylene glycol monomethyl ether. These solvents may be used alone, or two or more of these solvents may also be used in combination. The use amount of the solvent may appropriately be set taking into consideration the concentration of a product.

In addition, the polymerization initiator is not particularly limited, examples of which may include ordinary radical polymerization initiators such as 2,2'-azobis-(2,4-dimethylvaleronitrile), 2,2'-azobis(2-methylbutyronitrile), t-butylperoxy-2-ethyl hexanoate, 2,2'-azobisisobutyronitrile, benzoyl peroxide, di-t-butyl peroxide, and 1,1-bis(t-butylperoxy)-3,3,5-trimethylcyclohexane. The use amount of the polymerization initiator has to be appropriately determined from the required characteristic values of a polymer, and is not particularly limited, but may preferably be in a range of from 0.01% by mass to 50% by mass, more preferably from 0.05% by mass to 20% by mass, relative to the total amount of monomer components.

Further, if necessary, a chain transfer agent(s) and a regulating agent(s), such as dodecylmercaptan, laurylmercaptan, 2-mercaptoethanol, and carbon tetrachloride, may be used for the purpose of adjusting the molecular weight. The use amount of the chain transfer agent(s) or the regulating agent(s) has to be appropriately determined from the required molecular weight of a polymer, and is not particularly limited, but may preferably be in a range of from 0.01% by mass to 10% by mass, more preferably from 0.02% by mass to 5% by mass, relative to the total amount of monomer components.

The reaction temperature is not particularly limited, but may preferably be from room temperature to 200° C., more preferably from 40° C. to 140° C. The reaction time may appropriately be set so that the polymerization reaction is completed, depending upon the relative proportions of monomers in the monomer composition, the kind of the polymerization initiator, and the like.

Examples of the emulsifier which can be used when the monomer composition is copolymerized using an emulsion polymerization method may include anionic surfactants, cationic surfactants, nonionic surfactants, amphoteric surfactants, polymer surfactants, and polymerizable surfactants each having one or more polymerizable carbon-carbon unsaturated bonds in the molecule. These emulsifiers may be used alone, or two more of these emulsifiers may also be used in combination.

The anionic surfactant is not particularly limited, examples of which may include alkali metal alkyl sulfates such as sodium dodecyl sulfate and potassium dodecyl sulfate; ammonium alkyl sulfates such as ammonium dodecyl sulfate; sodium dodecyl polyglycol ether sulfate, sodium sulfosinoate, and alkali metal salts of sulfonated paraffin; alkyl sulfonates such as ammonium salt of sulfonated paraffin; fatty acid salts such as sodium laurate, triethanolamine oleate, triethanolamine oleate, and triethanolamine abietate. These anionic surfactants may be used alone, or two or more of these anionic surfactants may also be used in combination.

The cationic surfactant is not particularly limited, examples of which may include alkylarylsulfonates such as sodium dodecylbenzenesulfonate, and alkali metal sulfates of alkaliphenolhydroxyethylene; higher alkyl naphthalenesulfonates, naphthalenesulfonic acid formalin condensates, dialkyl sulfosuccinates, polyoxyethylene alkyl sulfates, and polyoxyethyelene alkylaryl sulfates. These cationic surfactants may be used alone, or two or more of these cationic surfactants may also be used in combination.

The nonionic surfactant is not particularly limited, examples of which may include fatty acid monogylcerides such as polyoxyethylene alkyl ether, polyoxyethylene alkyl aryl ether, sorbitan fatty acid ester, polyoxyethylene sorbitan fatty acid ester, and monolaurate of glycerol; polyoxyethylene oxypropylene copolymers, and condensation products of ethylene oxide and a fatty acid amine, an amide or an acid. These nonionic surfactants may be used alone, or two or more of these nonionic surfactants may also be used in combination.

The polymer surfactant is not particularly limited, examples of which may include polyvinyl alcohol, sodium poly(meth)acrylate, potassium poly(meth)acrylate, ammonium poly(meth)acrylate, polyhydroxyethyl (meth)acrylate, polyhydroxypropyl (meth)acrylate, copolymers of two or more of polymerizable monomers which are constituent units of these polymers, copolymers of these polymerizable monomers with other monomers, and phase transfer catalysts such as crown ethers. These polymer surfactants may be used alone, or two or more of these polymer surfactants may also be used in combination.

The polymerizable surfactant is not particularly limited, examples of which may include anionic surfactants such as propenyl-2-ethylhexylbenzenesulfosuccinic acid ester sodium, sulfates of polyoxyethylene (meth)acrylate, polyoxyethylene alkyl propenyl ether sulfuric acid ammonium salt, and phosphate esters of polyoxyethylene (meth)acrylate; and nonionic surfactants such as polyoxyethylene alkyl benzene ether (meth)acrylic acid esters, and polyoxyethylene alkyl ether (meth)acrylic acid esters. These polymerizable surfactants may be used alone, or two or more of these polymerizable surfactants may also be used in combination.

The use amount of the emulsifier is not particularly limited, but, for example, it may preferably be in a range of from 0.1% by mass to 50% by mass, more preferably from 1% by mass to 10% by mass.

In addition, examples of the polymerization initiator used in a emulsion polymerization method may include azo compounds such as 2,2'-azobisisobutyronitrile, 2,2'-azobis(2-amidinopropane) dihydrochloride, and 4,4'-azobis(4-cyanopentanoic acid); persulfates such as potassium persulfate, and peroxides such as hydrogen peroxide, peracetic acid, benzoyl peroxide, and di-t-butyl peroxide. These polymerization initiators may be used alone, or two or more of these polymerization initiators may also be used in combination. Further, in order to control the molecular weight at a prescribed value, as a reducing agent, there may be used a redox initiator(s) such as sodium hydrogen sulfite and L-ascorbic acid.

When the binder resin is a polyester resin, the polyester resin can mainly be obtained by the polycondensation of polyvalent carboxylic acids and polyhydric alcohols.

Examples of the polyvalent carboxylic acids used in the polyester resin may include aromatic polyvalent carboxylic acids such as phthalic acid, isophthalic acid, terephthalic acid, 1,2,4-benzenetricarboxylic acid, 2,5,7-naphthalenetricarboxylic acid, 1,2,4-naphthalenetricarboxylic acid, and pyromellitic acid; aliphatic dicarboxylic acids such as malonic acid, maleic acid, fumaric acid, succinic acid, adipic acid, azelaic acid, sebacic acid, gultaric acid, mesaconic acid, citraconic acid, and glutaconic acid; alicyclic dicarboxylic acids such as cyclohexanedicarboxylic acid and methylmedic acid; anhydrides and lower alkyl esters of these carboxylic acids. These polyvalent carboxylic acids may be used alone, or two or more of these polyvalent carboxylic acids may also be used in combination.

Examples of the polyhydric alcohols used in the polyester resin may include alkylene glycols such as ethylene glycol, 1,2-propylene glycol, 1,3-propylene glycol, 1,4-butenediol, 1,4-butanediol, neopentyl glycol, 1,5-pentane glycol, 1,6-hexane glycol, 3-methyl-1,5-pentanediol, and 2,2,4-trimethyl-1,3-pentanediol; alkylene ether glycols such as diethylene glycol, triethylene glycol, dipropylene glycol, polyethylene glycol, polypropylene glycol, and polytetramethylene glycol; aliphatic polyhydric alcohols such as 1,4-cyclohexanedimethanol and hydrogenated bisphenol A; bisphenols such as bisphenol A, bisphenol F, and bisphenol S; alkylene oxides of bisphenols. These polyhydric alcohols may be used alone, or two or more of these polyhydric alcohols may also be used in combination.

In addition, for the purpose of adjusting the molecular weight or controlling the reaction, there may be used, if necessary, monocarboxylic acids and monoalcohols. Examples of the monocarboxylic acids may include benzoic acid, p-oxybenzoic acid, toluenecarboxylic acid, salicylic acid, acetic acid, propionic acid, and stearic acid. Examples of the monoalcohols may include benzyl alcohol, toluene-4-methanol, and cyclohexanemethanol. These monocarboxylic acids and monoalcohols may be used alone, or two or more of these monocarboxylic acids and monoalcohols may also be used in combination.

The polyester resin is produced by an ordinary method using these starting materials. For example, an alcohol component(s) and an acid component(s) are placed in a reactor at a prescribed ratio, and a reaction is initiated at a temperature of from 150° C. to 190° C. in the presence of a catalyst, while an inert gas such as nitrogen is blown into the reactor. Low-molecular compounds produced as by-products are continuously removed to the outside of the reaction system. Thereafter, the reaction temperature is further raised to from 210° C. to 250° C. to promote the reaction to obtain an objective polyester resin. The reaction may be carried out even under any condition of normal pressure, reduced pressure, and increased pressure.

Example of the catalyst may include metals such as tin, titanium, antimony, manganese, nickel, zinc, lead, iron, magnesium, calcium, and germanium, and compounds thereof. These catalysts may be used alone, or two or more of these catalysts may also be used in combination.

When the binder resin is an urethane resin, the urethane resin can mainly be obtained by the reaction of polyhydric alcohols and diisocyanates.

Examples of the polyhydric alcohols used in the urethane resin may include alkylene glycols such as ethylene glycol, 1,2-propylene glycol, 1,3-propylene glycol, 1,4-butenediol, 1,4-butanediol, neopentyl glycol, 1,5-pentane glycol, 1,6-hexane glycol, 3-methyl-1,5-pentanediol, and 2,2,4-trimethyl-1,3-pentanediol; alkylene ether glycols such as diethylene glycol, triethylene glycol, dipropylene glycol, polyethylene glycol, polypropylene glycol, and polytetramethylene glycol; aliphatic polyhydric alcohols such as 1,4-cyclohexanedimethanol and hydrogenated bisphenol A; bisphenols such as bisphenol A, bisphenol F, and bisphenol S; alkylene oxides of bisphenols; polyhydric alcohols usually abbreviated as "PPG", which are obtained by addition polymerizing low-molecular polyols such as trimethylolpropane with propylene oxide, or which are obtained by addition polymerizing propylene oxide and ethylene oxide; polyoxytetramethylene glycols; polycaprolactone polyols; and polyester polyols. These polyhydric alcohols may be used alone, or two or more of these polyhydric alcohols may also be used in combination.

Examples of the diisocyanates used in the urethane resin may include aromatic diisocyanates such as tolylene diisocyanate, 4,4'-diphenylmethane diisocyanate, xylylene diisocyanate, and metaxylylene diisocyanate, including various isomers and mixtures thereof; aliphatic diisocyanates such as hexamethylene diisocyanate and trimethylhexamethylene diisocyanate; alicyclic diisocyanates such as 4,4'-methylenebis(cyclohexyl isocyanate), isophorone diisocyanate, and 1,3-di(isocyanatomethyl)cyclohexanone. These diisocyanates may be used alone, or two or more of these diisocyanates may also be used in combination.

The urethane resin is produced by an ordinary method using these starting materials. For example, an alcohol component(s) and an isocyanate component(s) are placed in a reactor at a prescribed ratio, and are reacted at a temperature of from room temperature to 150° C. in the presence of a catalyst, while an inert gas such as nitrogen is blown into the reactor.

Examples of the catalyst may include amines such as triethylamine, triethylenediamine, N,N-dimethylcyclohexylamine, N,N,N',N'-tetramethylethylenediamine, dimethylethanolamine, and N,N,N'-trimethylaminoethylethanolamine; morpholine compounds such as N-methylmorpholine and N-ethylmorpholine; organometalic compounds such as dibutyl tin dilaurate, lead octylate, potassium acetate, and potassium octylate. These catalysts may be used alone, or two or more of these catalysts may also be used in combination.

The type of the binder resin is not particularly limited, examples of which may include binder resins of the solvent-soluble type, the water-soluble type, the emulsion type, and the dispersion type (using an arbitrary solvent such as water or organic solvents). Examples of the solvent which can be used when the binder resin is dissolved or dispersed is not particularly limited, examples of which may include organic solvents and water, the organic solvents including aromatic solvents such as toluene, xylene, and others; alcohol solvents such as methyl alcohol, ethyl alcohol, isopropyl alcohol, n-butyl alcohol, isobutyl alcohol, propylene glycol methyl ether, and dipropylene glycol methyl ether; ester solvents such as butyl acetate, ethyl acetate, and cellosolve acetate; ketone solvents such as acetone, methyl ethyl ketone, and methyl isobutyl ketone; and alkylene glycol monoalkyl ether solvents such as ethylene glycol monomethyl ether, diethylene glycol monomethyl ether, and propylene glycol monomethyl ether. These solvents may be used alone, or two or more of these solvents may also be used in combination. In these solvents, low-molecular alcohol solvents such as methyl alcohol, ethyl alcohol, and isopropyl alcohol, and water may be preferred in that the solvent contained in the contents of microcapsules may be difficult to leach out. When the solvent to be used in the binder resin is different from a solvent used for the synthesis of the binder resin, solvent replacement may be carried out by any of the heretofore known methods such as methods using distillation techniques, and methods of carrying out the precipitation of the binder resin with an insoluble solvent and the re-dissolution of the binder resin in a prescribed solvent.

In addition, as a method of dispersing the binder resin in the solvent, there can be used any of the heretofore known methods such as self-dispersing methods and forcibly dispersing method. Examples of the surfactant which can be used in the forcibly dispersing method may include anionic surfactants, cationic surfactants, nonionic surfactants, amphoteric surfactants, and polymer surfactants. These surfactants may be used alone, or two or more of these surfactants may also be used in combination. Specific examples of these surfactants may include those listed above as the surfactants which can be used in the emulsion polymerization method.

Further, it may be preferred that the monomer components used should remain at as a small amount as possible in the binder resin. When the monomer components remain in the binder resin, the adhesiveness between the electrode films and the data display layer may be decreased, and the monomer components may enter into the microcapsules, resulting in a decrease of the electrophoretic property. The concentration of remaining monomer contained in the binder resin may preferably be 5,000 ppm or lower, more preferably 2,000 ppm or lower, and still more preferably 500 ppm or lower. The lower limit of the remaining monomer concentration is 0 ppm. In this connection, the remaining monomer concentration means the total concentration (by mass) of all kinds of monomers remaining in the solid content of the binder resin, and can be measured by any of the heretofore known methods such as gas chromatography and liquid chromatography.

<Microcapsules>

In the display sheet of the present invention, each of the microcapsules encloses a dispersion containing electrophoretic particles and a solvent in a shell.

(Electrophoretic Particles)

In general, there are, as a method for electrophoretic display, a display method on the basis of a contrast between the color of a solvent and the color of electrophoretic particles in a dispersion, and a display method on the basis of a contrast between the colors of at least two types of electrophoretic particles in a dispersion.

The electrophoretic particles to be used for the dispersion may be solid particles having electrophoretic properties, that is, colored particles showing positive or negative polarity in the dispersion and are not particularly limited, but, for example, pigment particles may be employed. Alternatively, polymer particles colored with dyes or polymer particles containing pigments may also be used. These solid particles may be used alone, or two or more of these solid particles may also be used in combination. In these solid particles, pigment particles may be preferred. In this connection, when solid particles having no electrophoretic properties in the dispersion are used as the electrophoretic particles, the electrophoretic properties are provided by any of the heretofore known methods. Alternatively, solid particles having electrophoretic properties in the dispersion and solid particles having no electrophoretic properties in the dispersion may also be used in combination.

The pigment particles to be used as the electrophoretic particles are not particularly limited, but they may be particles of, as white types, inorganic pigments such as titanium dioxide, barium sulfate, and zinc oxide; as yellow types, inorganic pigments such as yellow iron oxide, cadmium yellow, titanium yellow, and chrome yellow, and organic pigments, e.g., insoluble azo compounds such as fast yellow, fused azo compounds such as chromophthal yellow, azo complex salts such as benzimidazolone azo yellow, fused polycyclic compounds such as flavans yellow, hansa yellow, naphthol yellow, nitro compounds, and pigment yellow; as orange types, inorganic pigments such as molybdate orange, and organic pigments, e.g., azo complex salts such as benzimidazolone azo orange and fused polycyclic compounds such as perinone orange; as red types, inorganic pigments such as colcothar and cadmium red, and organic pigments, e.g., dye lakes such as madder lake, soluble azo compounds such as lake red, insoluble azo compounds such as naphthol red, fused azo compounds such as chromophthal scarlet, fused polycyclic compounds such as thioindigo Bordeaux, quinacridone pigments such as Cinquasia red Y and hostarparm red, and azo type pigments such as permanent red and fast slow red; as violet types, inorganic pigments such as manganese violet, and organic pigments, e.g., dye lakes such as Rhodamine lake, and fused polycyclic compounds such as dioxazine violet; as blue types, inorganic pigments such as Prussian blue, ultramarine, cobalt blue, and cerulean blue, and organic pigments, e.g., phthalocyanines such as phthalocyanine blue, indanthrenes such as indanthrene blue, and alkali blue; as green types, inorganic pigments such as emerald green, chrome green, chromium oxide, and viridian, and organic pigments, e.g., azo complex salts such as nickel azo yellow, nitroso compounds such as pigment green, and naphthol green, and phthalocyanines such as phthalocyanine green; as black types, inorganic pigments such as carbon black, titanium black, and iron black, and organic pigments such as aniline black. These pigment particles may be used alone, or two or more of these pigment particles may also be used in combination. In these pigment particles, there may be preferred white type pigment particles such as titanium dioxide and black type pigment particles such as carbon black and titanium black.

When fine particles of titanium dioxide are used, their type is not particularly limited, and so far as they are widely used as white type pigments, the particles may be either the rutile type or the anatase type, but taking into consideration the color fading of a coloring agent due to the photocatalyst activity of titanium dioxide, the rutile type which has lower photocatalyst activity may be preferred, and further, in order to lower the photocatalyst activity, it may be more preferred to use titanium dioxide which has been subjected to $SiO_2$ treatment, $Al_2O_3$ treatment, $SiO_2$—$Al_2O_3$ treatment, or $ZnO$—$Al_2O_3$ treatment.

When polymer particles are used as the electrophoretic particles, their component polymer is not particularly limited, but examples of the polymer may include polyolefin type polymers, poly(halogenated polyolefin) type polymers, polyester type polymers, polyurethane type polymers, polystyrene type polymers, acrylic type polymers, epoxy type polymers, melamine type polymers, and urea type polymers. The term "polymer(s)" as used herein may include homopolymers and copolymers obtained by copolymerization of a monomer(s) with a small amount of a copolymerizable monomer(s). These polymer particles may be used alone, or two or more of these polymer particles may also be used in combination. Dyes for coloring these polymer particles are not particularly limited, but examples of the dyes may include dyes recited below as the dye for coloring a solvent. The pigment to be added to these polymer particles is not particularly limited, but examples of the pigment may include pigments recited above as the pigment to be used for the electrophoretic particles.

The concentration of electrophoretic particles in a dispersion (i.e., percent (%) by mass of the electrophoretic particles, relative to the mass of the dispersion) may preferably have a lower limit of 5% by mass, more preferably 7% by mass, and still more preferably 10% by mass, and it may preferably have an upper limit of 60% by mass, more preferably 55% by mass, and still more preferably 50% by mass. If the concentration of electrophoretic particles is lower than 5% by mass, no sufficient chromaticity can be obtained, and contrast may be decreased to result in the unclearness of display. To the contrary, if the concentration of electrophoretic particles is higher than 60% by mass, the viscosity of a dispersion may be increased, so that dispersion treatment may become difficult, and the electrophoretic particles may be aggregated in a part to which voltage is applied for display, and it may lead to a decrease of contrast and a decrease of response time (display responsiveness) of the electrophoretic particles.

The particle diameter of electrophoretic particles is not particularly limited, but it may preferably have a lower limit of 0.1 µm and it more preferably have an upper limit of 5 µm, more preferably 4 µm, and still more preferably 3 µm. If the particle diameter of electrophoretic particle is smaller than 0.1 µm, no sufficient chromaticity can be obtained, and when the electrophoretic particles are used for an electrophoretic display device, contrast may be decreased to result in the unclearness of display. To the contrary, if the particle diameter of electrophoretic particles is greater than 5 µm, it is needed to heighten the coloration degree of the electrophoretic particles themselves beyond necessity, and accordingly, the use amount of pigments may be increased, and when the electrophoretic particles are used for an electrophoretic display device, it may become difficult for the electrophoretic particles to rapidly move in a part to which voltage is applied for display, so that their response time (display responsiveness) may be decreased. In this connection, the particle diameter of electrophoretic particles means their volume-average particle diameter measured by a dynamic light scattering particle size analyzer.

The electrophoretic particles may be dispersed as they are in a solvent, but after the surfaces of electrophoretic particles are treated by the reaction with a coupling agent, or by polymer grafting treatment, or by coating with a polymer, the electrophoretic particles may be dispersed in a solvent. When the surface treatment is carried out, the electrophoretic particles may preferably be pigment particles surface-treated with a coupling agent or a polymer. In the present invention, surface-treated electrophoretic particles may be referred simply to as electrophoretic particles.

(Solvent)

The solvent to be used for the dispersion is not particularly limited, but may be any of the solvent which have heretofore been widely used for a dispersion for electrophoretic display devices, and more specifically, there may be used those which are substantially insoluble in water (hydrophobic) and cause no interaction with the shells of the microcapsules to an extent that the functions of the microcapsules are not inhibited, and for example, highly insulating organic solvents may be preferred.

Examples of the highly insulating organic solvents may include aromatic hydrocarbons, e.g. benzene type hydrocarbons such as benzene, toluene, o-xylene, m-xylene, p-xylene, mixed xylene, ethylbenzene, hexylbenzene, dodecylbenzene, and phenylxylylethane; aliphatic hydrocarbons, e.g. paraffin type hydrocarbons such as hexane and decane, isoparaffin type hydrocarbons such as Isopar (registered trademark) series (available from ExxonMobil Chemical), olefin type hydrocarbons such as 1-octene and 1-decene, and naphthene type hydrocarbons such as cyclohexane and decalin; petroleum- and coal-derived hydrocarbon mixtures such as kerosene, petroleum ethers, petroleum benzin, ligroin, industrial gasoline, coal tar naphtha, petroleum naphtha, and solvent naphtha; halogenated hydrocarbons such as dichloromethane, chloroform, carbon tetrachloride, 1,2-dichloroethane, 1,1,1-trichloroethane, 1,1,2,2-tetrachloroethane, trichlorofluoroethane, tetrabromoethane, dibromotetrafluoroethane, tetrafluorodiiodoethane, 1,2-dichloroethylene, trichloroethylene, tetrachloroethylene, trichlorofluoroethylene, chlorobutane, chlorocyclohexane, chlorobenzene, o-dichlorobenzene, bromobenzene, iodomethane, diiodomethane, and iodoform; silicone oils such as dimethylsilicone oil and methylphenylsilicone oil; and fluorocarbon type solvents such as hydrofluoro ethers. These organic solvents may be used alone, or two or more of these organic solvents may also be used in combination. In these organic solvents, long-chain alkylbenzenes such as hexylbenzene and dodecylbenzene, phenylxylylethane, Isoper series (available from ExxonMobil Chemical), and dimethylsilicone oil may be preferred because they have high boiling points and high ignition points and they have almost no toxicity.

When a solvent is colored, it may be preferred to carry out colorization to an extent that sufficient contrast can be obtained to the color of electrophoretic particles (e.g., to white in the case of fine particles of titanium dioxide).

When a solvent is colored, a dye to be used for the colorization is not particularly limited, but oil-soluble dyes may be preferred, and particularly in terms of usability, azo dyes and anthraquinone dyes may be preferred. Specific examples of the dye may include, as yellow type dyes, azo compounds such as OIL YELLOW 3G (available from Orient Chemical Industries, Ltd.); as orange type dyes, azo compounds such as FAST ORANGE G (available from BASF AG); as blue type dyes, anthraquinones such as MACROLEX BLUE RR (available from BAYER AG); as green type dyes, anthraquinones such as SUMIPLAST GREEN G (available from Sumitomo Chemical Co., Ltd.); as brown type dyes, azo compounds such as OIL BROWN GR (available from Orient Chemical Industries, Ltd.); as red type dyes, azo compounds such as OIL RED 5303 (available from Arimoto Chemical Co., Ltd.) and OIL RED 5B (available from Orient Chemical Industries, Ltd.); as violet type dyes, anthraquinones such as OIL VIOLET #730 (available from Orient Chemical Industries, Ltd.); and as black type dyes, azo compounds such as SUDAN BLACK X60 (available from BASF AG) and mixtures of anthraquinone type MACROLEX BLUE FR (available from BAYER AG) and azo type OIL RED XO (available from Kanto Chemical Co., Inc.). These dyes may be used alone, or two or more of these dyes may also be used in combination.

The dispersion may contain, if necessary, besides electrophoretic particles and a solvent, a dye(s), a dispersant(s), an electric charge controlling agent(s), a viscosity modifier(s), and the like. Their addition amounts are not particularly limited, but may appropriately be adjusted to an extent that they neither affect the electrophoretic particles nor inhibit the functions of the electrophoretic particles.

(Shell)

The material forming the shells of the microcapsules is not particularly limited, so long as a solvent contained in the contents of the shell does not leach out, examples of which may include organic materials such as amino resins including urea resins and melamine resins, polyester resins, polyurethane resins, polyethylene resins, polystyrene resins, polyamide resins, (meth)acrylic resins, epoxy resins, vinyl acetate resins, and gelatin; and inorganic materials such as talc, clay, calcium stearate, iron oxide hydrate, cobalt carbonate, potassium carbonate, alkaline earth metal silicates, and silica. These materials may be used alone, or two or more of these materials may also be used in combination. In these materials, amino resins, epoxy resins, (meth)acrylic resins, and silica may be preferred in that a solvent contained in the contents of the shell is difficult to leach out, when mixed with the binder resin or when a data display layer is laminated with electrode films, and a shell with a double layer structure using two or more of these materials may particularly be preferred.

Examples of the microcapsules each having such a double-layer structure may include double-layer microcapsules in which the shell comprises an inner shell made of a mercapto group-containing amino resin and an outer shell made of an epoxy resin. These double-layer microcapsules have improved capsule strength and cause no leaching out (bleeding) of a solvent contained in the contents of the shell because the amino resin forming the inner shell has high impermeability, the epoxy resin forming the outer shell has excellent heat resistant and mechanical properties, and the amino resin forming the inner shell and the epoxy resin forming the outer shell are bonded firmly through mercapto groups.

In the double-layer microcapsules as described above, the inner shell can be formed by dispersing a dispersion containing electrophoretic particles and a solvent in a water-based medium, and subsequently carrying out a condensation reaction using a preliminary condensation product obtained by the reaction of at least one compound selected from the group consisting of urea, thiourea, melamine, benzoguanamine, acetoguanamine, and cyclohexylguanamine with formaldehyde in the presence of a compound having a mercapto group(s) and either a carboxyl group(s) or a sulfo group(s). In this connection, it can be analyzed by a Fourier transform infrared spectroscopy (FTIR) that the amino resin forming the inner shell has mercapto groups.

The outer shell can be formed by dispersing microcapsules each enclosing a dispersion in the inner shell in a water-based medium, and subsequently adding a compound having an epoxy group(s) thereto. In this connection, when the outer shell is formed, it may be preferred to cause a reaction of the compound having an epoxy group(s) with a crosslinking agent and/or add an epoxy-melamine condensation product in addition to the compound having an epoxy group(s) since the strength and impermeability of the outer shell are improved, so that the microcapsules are provided with higher performance.

The thickness of the shells of the microcapsules (in the case of double-layer microcapsules, the total thickness of the inner shell and the outer shell) is not particularly limited, but it may preferably be, for example, from 0.1 $\mu$m to 5 $\mu$m, more preferably from 0.1 $\mu$m to 4 $\mu$m, and still more preferably from 0.1 $\mu$m to 3 $\mu$m, in a swollen state. If the thickness of the shells of the microcapsules is thinner than 0.1 $\mu$m, it may become impossible to obtain sufficient capsule strength. To the contrary, if the thickness of the shells of the microcapsules is thicker than 5 $\mu$m, transparency is decreased, so that it may result in a contrast decrease, and the flexibility of the microcapsules is decreased, and therefore, the adhesiveness to an electrode film may become insufficient.

In addition, as a method of producing the microcapsules, there can be used a method of forming a shell using a dispersion containing electrophoretic particles and a solvent as a core substance, and using a dispersion in which the core substance is dispersed in a water-based medium, by any of the heretofore known microcapsulation techniques such as phase separation methods, drying-in-liquid methods, interfacial polymerization methods, in-situ polymerization methods, submerged curing film methods, spray drying methods, and surface deposition methods.

The water-based medium for dispersing a core substance is not particularly limited, but there can be used, for example, water or a mixed solvent of water with a hydrophilic organic solvent. When water and a hydrophilic organic solvent are used in combination, the addition amount of water may preferably have a lower limit of 70% by mass, more preferably 75% by mass, and still more preferably 80% by mass, and it may preferably have an upper limit of 95% by mass.

The hydrophilic organic solvent is not particularly limited, but examples of the hydrophilic organic solvent may include alcohols such as methanol, ethanol, n-propyl alcohol, isopropyl alcohol, and allyl alcohol; glycols such as ethylene glycol, propylene glycol, butylene glycol, pentanediol, hexanediol, heptanediol, and dipropylene glycol; ketones such as acetone, methyl ethyl ketone, methyl propyl ketone, and methyl isobutyl ketone; esters such as methyl formate, ethyl formate, methyl acetate, and methyl acetoacetate; and ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. These hydrophilic organic solvents may be used alone, or two or more of these hydrophilic organic solvents may also be used in combination.

The water-based medium may be used in combination with another solvent, besides water and a hydrophilic organic solvent. Examples of another solvent may include hexane, cyclopentane, pentane, isopentane, octane, benzene, toluene, xylene, ethylbenzene, aminylsqualene, petroleum ethers, terpene, castor oil, soybean oil, paraffin, and kerosene. When another solvent is used in combination, its use amount may preferably be 30% by mass or lower, more preferably 25% by mass or lower, and still more preferably 20% by mass or lower, relative to the water-based medium containing water and a hydrophilic organic solvent.

The amount of a core substance to be dispersed in a water-based medium is not particularly limited, but it may preferably have a lower limit of 5 parts by mass, more preferably 8 parts by mass, and still more preferably 10 parts by mass, relative to 100 parts by mass of the water-based medium, and it may preferably have an upper limit of 70 parts by mass, more preferably 65 parts by mass, and still more preferably 60 parts by mass, relative to 100 parts by mass of the water-based medium. If the amount for dispersion is lower than 5 parts by mass, the concentration of a core substance is low, so that it may take a long time to form capsule shells and it may become impossible to produce the desired microcapsules, and the microcapsules may have a wide particle size distribution to decrease production efficiency. To the contrary, if the amount for dispersion is higher than 70 parts by mass, a core substance is aggregated and the water-based medium is suspended in the core substance to make it impossible to produce the microcapsules.

When the core substance is dispersed in a water-based medium, a dispersant may be used, if necessary. The dispersant is not particularly limited, but examples of the dispersant may include water-soluble polymers (e.g., polyvinyl alcohol (PVA), carboxymethyl cellulose (CMC), gelatin, and gum arabic) and surfactants (e.g., anionic surfactants, cationic surfactants, amphoteric surfactants, and nonionic surfactants). These dispersants may be used alone, or two or more of these dispersants may also be used in combination. The addition amount of any of these dispersants is not particularly limited, so long as it does not inhibit inner shell formation, and it may appropriately be adjusted.

The microcapsules have flexibility to a certain extent, and since their shape can be changed by external pressure, the shape is not particularly limited, but it may preferably be particulate, e.g., truly spherical, when there is no external pressure.

The average particle diameter of the microcapsules is not particularly limited, but it may preferably have a lower limit of 5 μm, more preferably 10 μm, and still more preferably 15 μm, and it may preferably have an upper limit of 300 μm, more preferably 200 μm, and still more preferably 150 μm. If the average particle diameter of the microcapsules is smaller than 5 μm, it may become impossible to obtain sufficient display density in a display part. To the contrary, if the average particle diameter of the microcapsules is greater than 300 μm, the strength of the microcapsules may be decreased, and the electrophoretic properties of electrophoretic particles in a dispersion enclosed in the microcapsules cannot sufficiently be exhibited, and accordingly, the driving voltage for display may be increased. In this connection, the average particle diameter of the microcapsules means their volume-average particle diameter as measured by a laser scattering particle size distribution analyzer.

The variation coefficient (i.e., the narrowness of particle size distribution) of the particle diameter of the microcapsules is not particularly limited, but it may preferably be 30% or lower, more preferably 25% or lower, and still more preferably 20% or lower. The lower limit of the variation coefficient of the particle diameter of the microcapsules is not particularly limited, but it may most preferably be 0%. If the variation coefficient of the particle diameter of the microcapsules is higher than 30%, the microcapsules having an effective particle diameter may be decreased, and therefore, a great number of the microcapsules may have to be used in some cases.

The particle diameter and its variation coefficient of the microcapsules are considerably dependent on the particle diameter and particle size distribution of a dispersion obtained by dispersing the microcapsules in a water-based medium when the microcapsules are produced. Therefore, it is made possible to obtain the microcapsules having a desired particle diameter and its variation coefficient by appropriately adjusting the dispersing conditions of the dispersion. Further, for the purpose of obtaining the microcapsules having a narrow particle size distribution, it may be preferred to carry out the classification of microcapsules, and for the purpose of improving the product quality by the removal of impurities, it may be preferred to carry out the washing of microcapsules.

The classification of microcapsules may be carried out in such a manner that the microcapsules have a desired particle diameter or particle size distribution by any of the heretofore known methods, for example, sieving, filtration, centrifugal precipitation, or spontaneous precipitation of a dispersion containing the microcapsules in a water-based medium as it is or after dilution with an arbitrary water-based medium. In this connection, for microcapsules having a relatively great particle diameter, a sieving method may be effective.

The washing of microcapsules may be carried out by repeating the following operations: precipitating the microcapsules by any of the heretofore known methods, for example, centrifugal precipitation or spontaneous precipitation of a dispersion containing the microcapsules in a water-based medium as it is or after dilution with an arbitrary water-based medium; discarding the supernatant solution; recovering the precipitate; and again dispersing the precipitate in an arbitrary water-based medium. For microcapsules having a relatively great particle diameter, it may be preferred to employ spontaneous precipitation in order to avoid the breakage or damage of the microcapsules.

The process for producing the microcapsules as described above, each enclosing a dispersion containing electrophoretic particles and a solvent in a shell with a double layer structure composed of an inner shell made of a mercapto group-containing amino resin and an outer shell made of an epoxy resin, comprises dispersing a dispersion containing electrophoretic particles and a solvent as a core substance in a water-based medium; subsequently carrying out a condensation reaction using a preliminary condensation product obtained by the reaction of at least one compound selected from the group consisting of urea, thiourea, melamine, benzoguanamine, acetoguanamine, and cyclohexylguanamine with formaldehyde, in the presence of a compound having a mercapto group(s) and either a carboxyl group(s) or a sulfo group(s), thereby forming an inner shell made of a mercapto group-containing amino resin on the surface of the core substance; dispersing microcapsules each enclosing the core substance in the inner shell in a water-based medium; and successively adding an epoxy group-containing compound thereto, thereby forming an outer shell made of an epoxy resin on the outer surface of the inner shell.

The following will describe in detail such a production process along the respective steps.

(Dispersing of Core Substance)

First, using a dispersion containing electrophoretic particles and a solvent as a core substance, the core substance is dispersed in a water-based medium. The method of dispersing a core substance in a water-based medium may be carried out in the same manner as the above-described method, and therefore, its explanation will be omitted herein.

(Preparation of Preliminary Condensation Product)

Then, the preliminary condensation product is prepared by causing a reaction of at least one compound selected from the group consisting of urea, thiourea, melamine, benzoguanamine, acetoguanamine, and cyclohexylguanamine (hereinafter sometimes referred to as the "amino compound") with formaldehyde.

The preliminary condensation product obtained by the reaction of the amino compound with formaldehyde is a compound to be a precursor of an "amino resin" (i.e., urea resin, melamine resin, or guanamine resin). Using the specific preliminary condensation product, the inner shell made of an amino resin can be formed, and mercapto groups can be introduced into the amino resin produced from the preliminary condensation product by causing the reaction in the presence of a compound having a mercapto group(s) and either a carboxy or sulfo group(s).

With respect to the preliminary condensation product, (1) when at least one of urea and thiourea (hereinafter sometimes referred to as the "urea compound") is reacted with formaldehyde, there can be obtained a preliminary condensation product giving a urea resin; (2) when melamine is reacted with formaldehyde, there can be obtained a preliminary condensation product giving a melamine resin; and (3) when at least one of benzoguanamine, acetoguanamine, and cyclohexylguanamine (hereinafter sometimes referred to as the "guanamine compound") is reacted with formaldehyde, there can be obtained a preliminary condensation product giving a guanamine resin. In addition, (4) when at least two of the urea compound, melamine, and the guanamine compound are reacted with formaldehyde, there can be obtained a preliminary condensation product giving a resin containing at least two types of urea resin, melamine resin, and guanamine resin. These preliminary condensation products (1) to (4) may be used alone, or two or more of these preliminary condensation products (1) to (4) may also be used in combination.

In general, the reaction of the amino compound with formaldehyde is carried out using water as a solvent. Therefore, the reaction may be carried out, for example, by a method of mixing the amino compound with an aqueous formaldehyde solution and carrying out the reaction, or by a method of preparing an aqueous formaldehyde solution by the addition of water to trioxane or p-formaldehyde, mixing the amino compound with the aqueous formaldehyde solution thus obtained, and carrying out the reaction. From economical points of view, e.g., in terms of no need to prepare an aqueous formaldehyde solution and the availability of an aqueous formaldehyde solution, there may be preferred a method of mixing the amino compound with an aqueous formaldehyde solution and carrying out the reaction. In addition, when the amino compound is mixed with an aqueous formaldehyde solution, either of adding the amino compound to the aqueous formaldehyde solution or adding the aqueous formaldehyde solution to the amino compound may be possible. The condensation reaction may preferably be carried out under stirring using any of the heretofore known stirring apparatuses.

The amino compound may preferably be urea, melamine, and benzoguanamine, more preferably melamine, a combination of melamine and urea, and a combination of melamine and benzoguanamine.

As the amino compound, another amino compound may be used, besides the above amino compound. Examples of another amino compound may include capriguanamine, amerine, ameride, ethylene urea, propylene urea, and acetylene urea. When another amino compound is used, amino compounds including another amino compound are used as starting materials for the preliminary condensation product.

With respect to the reaction for obtaining a preliminary condensation product, the addition amounts of the amino compound and formaldehyde are not particularly limited, but they may preferably be, by the mole ratio of amino compound/formaldehyde, from 1/0.5 to 1/10, more preferably from 1/1 to 1/8, and still more preferably from 1/1 to 1/6. If the mole ratio of amino compound/formaldehyde is lower than 1/10, the amount of unreacted formaldehyde may be increased, and therefore, the reaction efficiency may be decreased. To the contrary, if the mole ratio of amino compound/formaldehyde is higher than 1/0.5, the amount of unreacted amino compound may be increased, and therefore, the reaction efficiency may be decreased. In this connection, if water is used as the solvent for the reaction, the addition amounts of the amino compound and formaldehyde, relative to the solvent, that is, the concentrations of the amino compound and formaldehyde at the time of feed may be more desirable to be higher, so long as there is no particular obstacle in the reaction.

The reaction temperature for carrying out the reaction for obtaining a preliminary condensation product is not particularly limited, but it may preferably have a lower limit of 55° C., more preferably 60° C., and still more preferably 65° C., and it may preferably have an upper limit of 85° C., more preferably 80° C., and still more preferably 75° C. When the end point of the reaction is confirmed, the reaction may be finished by an operation such as cooling of a reaction solution to room temperature (e.g., from 25° C. to 30° C.). Thus, the reaction solution containing a preliminary condensation product can be obtained. The reaction time is not particularly limited, but it may appropriately be set in accordance with the feed amounts.

(Formation of Inner Shell)

Then, a condensation reaction is carried out using a preliminary condensation product in a water-based medium containing a core substance dispersed therein in the presence of a compound having a mercapto group(s) (—SH) and either a carboxyl group(s) (—COOH) or a sulfo group(s) (—$SO_3H$) (hereinafter sometimes referred to as the "thiol compound") to form an inner shell made of a mercapto group-containing amino resin on the surface of the core substance. This operation gives microcapsules each enclosing a dispersion containing electrophoretic particles and a solvent in an inner shell made of a mercapto group-containing amino resin.

The addition amount of a preliminary condensation product is not particularly limited, but it may preferably have a lower limit of 0.5 parts by mass, relative to 1 part by mass of a core substance, and it may preferably have an upper limit of 10 parts by mass, more preferably 5 parts by mass, and still more preferably 3 parts by mass, relative to 1 part by mass of a core substance. The thickness of an inner shell can easily be controlled by adjusting the addition amount of a preliminary condensation product. If the addition amount of a preliminary condensation product is lower than 0.5 parts by mass, it may become impossible to form a sufficient amount of an inner shell or the thickness of an inner shell may become thinner, so that the strength and impermeability of the inner shell may be lowered. To the contrary, if the addition amount of a preliminary condensation product is higher than 10 parts by mass, the thickness of an inner shell may become thicker, so that the flexibility and transparency of the inner shell may be lowered.

A method of adding a preliminary condensation product to a water-based medium is not particularly limited, but either of collective addition or successive addition (continuous addition and/or intermittent addition) may be employed. The addition of a preliminary condensation product may be preferred to be carried out under stirring using any of the heretofore known stirring apparatuses.

The thiol compound to be used in the condensation reaction is not particularly limited, but examples of the thiol compound may include cysteine (2-amino-3-mercaptopropionic acid), mercaptoacetic acid, mercaptopropionic acid, mercaptobenzoic acid, mercaptosuccinic acid, mercaptoethanesulfonic acid, mercaptopropanesulfonic acid, their alkali metal salts, their alkaline earth metal salts, and their ammonium salts. These thiol compounds may be used alone, or two or more of these thiol compounds may also be used in combination. In these thiol compounds, L-cysteine may be preferred from economical points of view, e.g., in terms of availability.

The addition amount of a thiol compound is not particularly limited, but it may preferably have a lower limit of 1 part by mass, relative to 100 parts by mass of a preliminary condensation product, and it may preferably have an upper limit of 20 parts by mass, more preferably 10 parts by mass, and still more preferably 5 parts by mass, relative to 100 parts by mass of a preliminary condensation product. If the addition amount of a thiol compound is lower than 1 part by mass, since the amount of mercapto groups to be introduced into the amino resin may be low, firm bonds with an epoxy resin forming an outer shell cannot be formed in some cases. To the contrary, if the addition amount of a thiol compound is higher than 20 parts by mass, the strength and impermeability of an inner shell may be lowered.

A method of adding a thiol compound to a water-based medium is not particularly limited, but it may be preferred to be carried out by adding a preliminary condensation product to a water-based medium containing a core substance dispersed therein, sufficiently stirring the mixture thus obtained, and then dropwise adding a thiol compound in form of an aqueous solution. The condensation reaction may be preferred to be carried out under stirring using any of the heretofore known stirring apparatuses.

In the production process as described herein, an inner shell is formed on the surface of a core substance by carrying out the condensation reaction of a preliminary condensation product in the presence of a thiol compound in a water-based medium containing the core substance dispersed therein. Specifically, while the amino group(s) of a preliminary condensation product and the carboxyl group(s) or sulfo group(s) of a thiol compound are reacted with each other, the condensation reaction of the preliminary condensation product is carried out to deposit a mercapto group-containing amino resin on the surface of a core substance to form an inner shell.

The reaction temperature for carrying out the condensation reaction is not particularly limited, but it may preferably have a lower limit of 25° C., more preferably 30° C., and still more preferably 35° C., and it may preferably have an upper limit of 80° C., more preferably 70° C., and still more preferably 60° C. The reaction time is not particularly limited, but it may appropriately be set in accordance with the feed amounts.

After the condensation reaction is carried out, an aging period may be provided. The temperature for aging is not particularly limited, but it may preferably be a temperature equal to or slightly higher than the reaction temperature for carrying out the condensation reaction. The aging period is not particularly limited, but it may preferably have a lower limit of 0.5 hours, more preferably 1 hour, and it may preferably have an upper limit of 5 hours, more preferably 3 hours.

After an inner shell is formed, the microcapsules thus obtained may be separated from the water-based medium by any of the heretofore known methods, for example, suction filtration or spontaneous filtration, if necessary, but since an amino resin forming an inner shell is very fragile and may possibly be broken or damaged by weak impact or pressure, it may be preferred to subject the microcapsules to the next process without separating the microcapsules from the water-based medium. The microcapsules obtained at the step of forming an inner shell may preferably be subjected to classification for the purpose of obtaining the microcapsules having a narrow particle size distribution, and/or, to washing for the purpose of improving the product quality by the removal of impurities. The methods of classification and washing of microcapsules may be carried out in the same manner as the above-described methods.

(Formation of Outer Shell)

Then, after microcapsules each enclosing a core substance in an inner shell are dispersed in a water-based medium, an epoxy group-containing compound (hereinafter sometimes referred to as the "epoxy compound") is added, and an outer shell made of an epoxy resin is formed on the outer surface of the inner shell. This operation gives microcapsules each enclosing a dispersion containing electrophoretic particles and a solvent in a shell having an inner shell made of a mercapto group-containing amino resin and an outer shell made of an epoxy resin.

The water-based medium for dispersing microcapsules each enclosing a core substance in an inner shell may include water-based mediums recited above as the water-based medium for dispersing the core substance when the inner shell is formed. Since microcapsules each enclosing a core substance in an inner shell can be obtained in the form of a dispersion of the microcapsules in the water-based medium, the microcapsules may be subjected, without being separated or dispersed again in a water-based medium, to the step of forming an outer shell in the form of a dispersion of the microcapsules in the water-based medium as it is or after concentration or dilution.

The epoxy compound is not particularly limited, but there may be preferred water-soluble epoxy compounds having two or more epoxy groups in one molecule, of which examples may include sorbitol polyglycidyl ether, sorbitan polyglycidyl ether, polyglycerol polyglycidyl ether, pentaerythritol polyglycidyl ether, triglycidyltris-(2-hydroxyethyl) isocyanurate, trimethylolpropane polyglycidyl ether, neopentyl glycol diglycidyl ether, polyethylene glycol diglycidyl ether, polypropylene glycol diglycidyl ether, and adipic acid diglycidyl ether. These epoxy compounds may be used alone, or two or more of these epoxy compounds may also be used in combination.

The weight-average molecular weight of an epoxy compound may preferably have a lower limit of 300 and it may preferably have an upper limit of 100,000, more preferably 75,000, and still more preferably 50,000. If the weight-average molecular weight of an epoxy compound is lower than 300, it may become impossible to obtain an outer shell having sufficient strength. To the contrary, if the weight-average molecular weight of an epoxy compound is higher than 100,000, the viscosity of the reaction system may be increased to make stirring difficult.

The addition amount of an epoxy compound is not particularly limited, but it may preferably have a lower limit of 0.5 parts by mass, relative to 1 part by mass of a core substance, and it may preferably have an upper limit of 10 parts by mass, more preferably 5 parts by mass, and still more preferably 3 parts by mass, relative to 1 part by mass of a core substance. The thickness of an outer shell can easily be controlled by adjusting the addition amount of the epoxy compound. If the addition amount of an epoxy compound is lower than 0.5 parts by mass, it may become impossible to form a sufficient amount of an outer shell, or the thickness of an outer shell may become thinner, so that the strength of the outer shell may be lowered. To the contrary, if the addition amount of an epoxy compound is greater than 10 parts by mass, the thickness of an outer shell may become thicker, so that the flexibility and transparency of the outer shell may be lowered.

A method of adding the epoxy compound to a water-based medium is not particularly limited, but either of collective addition or successive addition (continuous addition and/or intermittent addition) may be employed. The addition of a preliminary condensation product may be preferred to be carried out under stirring using any of the heretofore known stirring apparatuses after microcapsules each enclosing a core substance in an inner shall are dispersed in the water-based medium.

When an outer shell made of an epoxy resin is formed, a reaction of the epoxy compound with a crosslinking agent may be carried out. A reaction of the epoxy compound with a crosslinking agent can improve the strength of an outer shell, and therefore, the strength of shells, so that the breakage or damage of the shells can effectively be suppressed when the microcapsules are thereafter separated or washed.

The crosslinking agent is not particularly limited, but examples of the crosslinking agent may include sodium diethyldithiocarbamate (including its hydrate), diethylammonium diethyldithiocarbamate (including its hydrate), dithiooxalic acid, and dithiocarbonic acid. These crosslinking agents may be used alone, or two or more of these crosslinking agents may also be used in combination.

The addition amount of a crosslinking agent is not particularly limited, but it may preferably have a lower limit of 1 part by mass, more preferably 5 parts by mass, and still more preferably 10 parts by mass, relative to 100 parts by mass of an epoxy compound, and it may preferably have an upper limit of 100 parts by mass, more preferably 90 parts by mass, and still more preferably 80 parts by mass, relative to 100 parts by mass of an epoxy compound. If the addition amount of a crosslinking agent is lower than 1 part by mass, it may become impossible to sufficiently improve the strength of an outer shell. To the contrary, if the addition amount of a crosslinking agent is higher than 100 parts by mass, since the crosslinking agent may react on the epoxy group of the epoxy compound to an excess extent, the flexibility of an outer shell may be decreased.

A method of adding a crosslinking agent to a water-based medium may be a method of adding a crosslinking agent together with the epoxy compound or a method of adding a crosslinking agent before or after the addition of the epoxy compound, although it is not particularly limited thereto, but it may be preferred to dropwise add a crosslinking agent in the form of an aqueous solution under stirring after a while from the addition of the epoxy compound in the form of an aqueous solution to a water-based medium in which microcapsules each enclosing a core substance in an inner shell are dispersed.

When an outer shell made of an epoxy resin is formed, an epoxy-melamine condensation product may be added in addition to the epoxy compound. The addition of an epoxy-melamine condensation product can improve the impermeability of an outer shell, and therefore, the impermeability of shells, so that microcapsules can be provided with higher performance.

The epoxy-melamine condensation product may be a preliminary condensation product produced from the epoxy compound, melamine, and formaldehyde by any of the heretofore known methods, although it is not particularly limited thereto, but it can further be reacted with at least one compound selected from the group consisting of urea, thiourea, benzoguanamine, acetoguanamine, and cyclohexylguanamine. Preferred examples of the epoxy-melamine condensation product may include a condensation product produced by the reaction of a compound, which is obtained by the reaction of the epoxy compound with urea, with a preliminary condensation product, which is obtained by the reaction of melamine, urea, and formaldehyde.

The addition amount of an epoxy-melamine condensation product is not particularly limited, but it may preferably have a lower limit of 0 parts by mass, relative to 1 part by mass of an epoxy compound, and it may preferably have an upper limit of 10 parts by mass, more preferably 8 parts by mass, and still more preferably 5 parts by mass, relative to 1 part by mass of an epoxy compound. If the addition amount of an epoxy-melamine condensation product is greater than 10 parts by mass, an outer shell may become fragile, so that the strength of the outer shell may be decreased.

A method of adding an epoxy-melamine condensation product to a water-based medium may be carried out, together with the addition of the epoxy compound, or before or after the addition of the epoxy compound, although it is not particularly limited thereto, but it may be preferred to add an epoxy-melamine condensation product in the form of an aqueous solution after a while from the addition of the epoxy compound in the form of an aqueous solution to a water-based medium in which microcapsules each enclosing a core substance in an inner shell are dispersed. When the reaction of a crosslinking agent is carried out, it may be preferred to dropwise add the crosslinking agent in the form of an aqueous solution after a while from the addition of an epoxy-melamine condensation product in the form of an aqueous solution.

The temperature for forming an outer shell is not particularly limited, but it may preferably have a lower limit of 25° C., more preferably 30° C., and still more preferably 35° C., and it may preferably have an upper limit of 80° C., more preferably 70° C., and still more preferably 60° C. The reaction time for forming an outer shell is not particularly limited and it may appropriately be set in accordance with the feed amounts.

After an outer shell is formed, an aging period may be provided. The temperature for the aging is not particularly limited, but it may preferably be a temperature equal to or slightly higher than the temperature for forming an outer shell. The aging period is not particularly limited, but it may preferably have a lower limit of 0.5 hours, more preferably 1 hour, and it may preferably have an upper limit of 5 hours, more preferably 3 hours.

After an outer shell is formed, the microcapsules thus obtained may be separated from the water-based medium by any of the heretofore known methods, for example, suction filtration or spontaneous filtration, if necessary, but since the solvent of a core substance may leak and be evaporated, if the microcapsules are kept in a dry state, and it results in the deformation of the microcapsules, it may be preferred to subject the microcapsules to the next process without separating the microcapsules from the water-based medium.

The microcapsules obtained at the step of forming an outer shell may be preferred to be classified to obtain the microcapsules in a narrow particle size distribution and/or may be preferred to be washed to remove impurities to improve product quality.

The classification and washing of the microcapsules can be carried out in the same manner for microcapsules obtained at the step of forming an inner shell, and therefore, their explanation will be omitted herein.

<Data Display Layer>

In the display sheet of the present invention, the microcapsules are arranged approximately in a single layer between the electrically conductive layers of two opposite electrode films, and are fixed with the binder resin so that their arrangement can be maintained, and form a data display layer together with the binder resin.

The thickness of the data display layer may vary depending upon the particle diameters of the microcapsules, and therefore, it is not particularly limited, but it may preferably have a lower limit of 10 µm, more preferably 15 µm, and still more preferably 20 µm, and it may preferably have an upper limit of 200 µm, more preferably 150 µm, and still more preferably 100 µm. If the thickness of the data display layer is thinner than 10 µm, sufficient display concentrations cannot be obtained in the display parts, so that the display parts cannot be clearly distinguished from the other non-display parts. To the contrary, if the thickness of the data display layer is thicker than 200 µm, the electrophoretic particles in a dispersion enclosed into the microcapsules cannot exhibit sufficient electrophoretic properties, so that display characteristics such as contrast may become decreased or the driving voltage for display may become raised.

In the data display layer, there may be the case where the microcapsules have the same shapes as those which are in the coating solution for forming the data display layer or the case where the microcapsule have been deformed through a drying step after applying the coating solution on the electrically conductive layer of one electrode film. Further, there may be the case where the microcapsules have been deformed when the electrically conductive layer of the other electrode film is put on the data display layer, followed by lamination. In any case, the microcapsules may have a spherical shape or a deformed spherical shape. In the contact portions between the adjacent microcapsules or in the contact portions between the microcapsules and the electrode films, the microcapsules may be deformed by compression to come into contact on their planes. In addition, the microcapsules may be arranged approximately in a single layer or may partially be overlaid with each other, if the intended functions are not deteriorated.

<Electrode Films>

In the display sheet of the present invention, two opposite electrode films have the function of sandwiching the data display layer containing the microcapsules and the binder resin.

The electrode films used in the display sheet of the present invention may be non-transparent electrode films or transparent electrode films, although they are not particularly limited, and because the data display layer is sandwiched with two opposite electrode films, it requires that at least one of the electrode films is transparent in order to look at display data with eyes.

The electrode film has an electrically conductive layer on one surface of a base material film. The material of the base material film may include acrylic resins, polyester resins, polyolefin resins, polycarbonate resins, and polyimide resins. In these resins, polyester resins may be preferred, and polyethylene terephthalate (PET) and polyethylene naphthalate (PEN) may particularly be preferred. The material of the electrically conductive layer may include inorganic electrically conductive sub-stances such as indium tin oxide (ITO), zinc oxide, metal fine particles, and metal foils; and organic electrically conductive substances such as polyacethylene, polyaniline, polypyrrole, polyethylenedioxythiophene, and polythiophene. The method of forming an electrically conductive layer on a base material film may include dry coating methods such as vacuum deposition and spattering; and wet coating methods such as applying a dispersion or solution of an electrically conductive substance. Incidentally, the electrode film may be prepared by oneself, or various kinds of commercially available electrode films can be utilized.

The thickness of the electrode film is not particularly limited, but may preferably be not thinner than 20 µm and not thicker than 200 µm. If the thickness of the electrode film is thinner than 20 µm, wrinkles may easily occur on the electrode film. To the contrary, if the thickness of the electrode film is thicker than 200 µm, the roll diameter may become great when the electrode film is wound around in the form of a roll, thereby making it difficult to handle the roll, or the amount of waste materials after use may become increased.

<Others>

The display sheet of the present invention can be attached on the surface thereof with another film material or sheet material such as an antireflection film, an anti-glare film, a hard coat film, an shock-absorbing sheet, an electrode film, a surface protective film, and a colored sheet, or can be applied with another coating material on the surface thereof. In addition, the display sheet of the present invention can be used by attachment on another material such as such sheet-shaped or plate-shaped material. Further, the display sheet of the present invention may be used after processing into a desired size or shape.

<<Process for Producing a Sheet for Electrophoretic Display Devices>>

The process for producing a sheet for electrophoretic display devices according to the present invention (hereinafter sometimes referred to as "the production process of the present invention") is a process for producing the above-described sheet for electrophoretic display devices, and it comprises: forming a data display layer on an electrically conductive layer of a first electrode film, the data display layer containing microcapsules for electrophoretic display devices and a binder resin, wherein the binder resin has a weight-average molecular weight of from 40,000 to 300,000 and a glass transition temperature of from −50° C. to 10° C.; and putting an electrically conductive layer of a second electrode film on the data display layer, followed by lamination.

The following will describe in detail the production process of the present invention. However, the production process of the present invention is not restricted to the following descriptions, and besides the following exemplified matter, it can be put into practice after appropriate modifications or variations within such a range that the gists of the present invention are not adversely affected.

<Coating Solution>

When the display sheet of the present invention is produced, first, on an electrically conductive layer of a first electrode film, there is formed a data display layer the data display layer containing microcapsules for electrophoretic display devices and a binder resin, wherein the binder resin has a weight-average molecular weight of from 40,000 to 300,000 and a glass transition temperature of from −50° C. to 10° C.

To form the data display layer, a coating solution containing the microcapsules and the binder resin may be applied on an electrically conductive layer of a first electrode film, and the resulting coated film may be dried. The microcapsules and the binder resin are the same as described above, and therefore, their explanation will be omitted herein. Incidentally, applying the coating solution on the electrically conductive layer of the first electrode film may sometimes be described hereinafter simply as "on the electrode film, there is applied the coating solution" or "applying the coating solution on the electrode film".

The mixing ratio of the microcapsules and the binder resin in the coating solution is not particularly limited, so long as the data display layer can be formed, but, for example, microcapsules/binder resin in terms of a solid content ratio may preferably be in a range of from 10/0.5 to 10/10, more preferably from 10/1 to 10/7. If microcapsules/binder resin in terms of a solid content ratio is greater than 10/0.5 and the proportion of the binder resin is smaller as compared with the microcapsules, the adhesiveness between the electrode films and the data display layer may be decreased or air may be incorporated between the microcapsules, resulting in a deterioration of display performance. To the contrary, microcapsules binder resin in terms of a solid content ratio is smaller than 10/10 and the proportion of the binder resin is greater as compared with the microcapsules, the electrophoretic properties may be decreased, resulting in a deterioration of display performance.

The coating solution can contain, besides the microcapsules and the binder resin, any other ingredients, if necessary. Examples of the other ingredients may include solvents, dispersants, viscosity modifiers, preservatives, and defoamers.

Examples of the solvent may include organic solvents and water, the organic solvents including aromatic solvents such as toluene, xylene, and others; alcohol solvents such as methyl alcohol, ethyl alcohol, isopropyl alcohol, n-butyl alcohol, isobutyl alcohol, propylene glycol methyl ether, and dipropylene glycol methyl ether; ester solvents such as butyl acetate, ethyl acetate, and cellosolve acetate; ketone solvents such as acetone, methyl ethyl ketone, and methyl isobutyl ketone; alkylene glycol monoalkyl ether solvents such as ethylene glycol monomethyl ether, diethylene glycol monomethyl ether, and propylene glycol monomethyl ether. These solvents may be used alone, or two or more of these solvents may also be used in combination.

Examples of the dispersants may include polyacrylate salts; styrene-maleic acid copolymer salts; formalin condensates of naphthalene sulfonic acid salts; long-chain alkyl organic sulfonic acid salts; polyphosphonic acid salts; long-chain alkyl amine salts; polyalkylene oxides; polyoxyalkylene alkyl ethers; sorbitan fatty acid esters; fluorine-type surfactants such as perfluoroalkyl group-containing salts, perfluoroalkyl group-containing esters, and perfluoroalkyl group-containing oligomers; and non-ionic surfactants such as those of the acetylene diol type and those of the acetylene glycol type. These dispersants may be used alone, or two or more of these dispersants may also be used in combination.

Examples of the viscosity modifiers may include cellulose-type viscosity modifiers such as carboxymethylcellulose, methylcellulose, and hydroxyethylcellulose; polycarboxlic acid-type viscosity modifiers such as sodium polyacrylates, alkali-soluble emulsions, and associated-form alkali-soluble emulsions; polyethylene glycol-type viscosity modifiers such as polyethylene glycol, polyethyleneglycol alkyl ether, polyethylene glycol alkyl esters, and associated-form polyethylene glycol derivatives; other water-soluble polymer-type viscosity modifiers such as polyvinyl alcohol; and smectite-type viscosity modifiers such as montmorillonite, hectorite, and saponite. These viscosity modifiers may be used alone, or two or more of these viscosity modifiers may also be used in combination.

Examples of the preservatives may include organic nitrogen sulfur compounds, organic nitrogen halogen compounds, chlorhexidine salts, cresol-type compounds, bromine-type compounds, aldehyde-type compounds, benzimidazole-type compounds, halogenated cyclic sulfur compounds, organic arsenic compounds, organic copper compounds, isothiazolone chloride, and isothiazolone. These preservatives may be used alone, or two or more of these preservatives may also be used in combination.

Examples of the defoamers may include silicone-type defoamers, Pluronic-type defoamers, mineral oil-type defoamers, polyester-type defoamers, and polyether-type defoamers. These defoamers may be used alone, or two or more of these defoamers may also be used in combination.

When other ingredients are added to the coating solution, the amounts of these other ingredients to be added are not particularly limited, so long as they do not inhibit the application of the coating solution to electrode films and the effects of using these other ingredients can be obtained.

The viscosity of the coating solution is not particularly limited, but it may preferably have a lower limit of 50 mPa·s, more preferably 100 mPa·s, and it may preferably have an upper limit of 5,000 mPa·s, more preferably 4,000 mPa·s, and still more preferably 3,000 mPa·s. If the viscosity of the coating solution is within the above range, the microcapsules can be arranged approximately in a single layer without any gaps on an electrically conductive layer of a first electrode film, thereby making it possible to finish a coated film in such a condition that the microcapsules are densely filled on the first electrode film.

<Method of Application>

A method of applying a coating solution on an electrode film is not particularly limited, examples of which may include wire bar coating methods, roll coating methods, knife coating methods, blade coating methods, slit coating methods, gravure coating methods, dipping coating methods, spray coating methods, spin coating methods, and screen printing methods. In these application methods, roll coating methods, knife coating methods, blade coating methods, slit coating methods, gravure coating methods, and screen printing methods may be preferred in that uniform application can be made relatively easily when a coating solution containing the microcapsules is applied on an electrode film. In addition, these application methods may be carried out in a film-feed manner or in a continuous application manner by roll-to-roll. These application manners can appropriately be selected as necessary.

The coating solution applied to an electrode film, i.e., the coated film, is dried, so that the data display layer is formed on the electrode film. Since the binder resin is incorporated into the coating solution, the binder resin has the function of bonding the microcapsules to the electrode film.

As the drying method, there may be used any of the heretofore known drying techniques, although it is not particularly limited thereto. Examples of the drying method may include natural drying and forced drying. As the forced drying means, there can be used any of the heretofore known drying means such as hot air and far-infrared ray. The drying conditions, although they are not particularly limited, may appropriately be set depending upon the viscosity of a coating solution and the area of a coated film. For example, the drying temperature may preferably have a lower limit of 15° C., more preferably 20° C., and it may preferably have an upper limit of 150° C., more preferably 120° C. The drying time may preferably have a lower limit of 5 seconds, more preferably 10 seconds, and it may preferably have an upper limit of 60 minutes, more preferably 45 minutes. These drying temperature and drying time may be constant during the drying step or may be changed in a stepwise manner during the drying step.

The thickness of a coating solution applied on an electrode film may appropriately be set depending upon the particle diameters of the microcapsules, and therefore, it is not particularly limited, but it may preferably have a lower limit of 10 μm, more preferably 15 μm, and it may preferably have an upper limit of 200 μm, more preferably 150 μm, and still more preferably 100 μm. The thickness in a wet state is appropriately adjusted by the non-volatile content of the coating solution.

Further, one adhesive layer made of the binder resin may be formed on the surface of the coated film obtained by drying the coating solution (i.e., on the surface on which an electrode film as an opposite electrode is laminated). Since irregularities due to the microcapsules may be generated on the surface of the coated film obtained by drying the coating solution, these irregularities can be eliminated and air can be prevented from entering between the data display layer and the laminated electrode film by further providing one adhesive layer. The thickness of the adhesive layer may appropriately be set depending upon the depth of generated irregularities, and the flexibility of the microcapsules, although it is not particularly limited, but it may preferably be 10 μm or thinner, more preferably 5 μm or thinner, still more preferably 3 μm or thinner. If the thickness of the adhesive layer is thicker than 10 μm, the electrophoretic properties may be decreased, resulting in a deterioration of display performance. The lower limit of the thickness of the adhesive layer is around 0.5 μm.

<Method of Lamination and Its Conditions>

When the display sheet of the present invention is produced, a data display layer is formed on an electrically conductive layer of a first electrode film, and then, an electrically conductive layer of a second electrode film is put on the data display layer, followed by lamination. The method of lamination is not particularly limited, but there can be employed any of the heretofore known laminating techniques such as a method of applying a pressure by allowing laminate materials to pass though a pair of laminate rolls. In addition, lamination may be carried out under heating, if necessary, by adjusting the laminate rolls to an appropriate temperature.

In order to obtain an electrophoretic display device which can stably exhibit excellent display quality, generally, the display sheet may be preferred to have sufficient adhesiveness (wide contact surface area) of the microcapsules to two opposite electrode films. If the adhesiveness between the microcapsules and two opposite electrode films is low, the response of electrophoretic particles may be lowered or the contrast may be decreased. To improve the adhesiveness, it is supposed, for example, to increase the pressure and temperature for lamination. In addition, with respect to the microcapsules to be used, the content ratios of components forming a shell may appropriately be set to increase flexibility and adhesiveness, and accordingly, the easiness of the adhesion of the microcapsules to the electrode films can further be improved. In this case, even if conditions such as temperature and pressure for lamination are moderated to a certain extent, sufficient adhesiveness can be obtained.

The lamination pressure may preferably have a lower limit of 0.1 MPa, more preferably 0.15 MPa, still more preferably 0.2 MPa, and it may preferably have an upper limit of 4 MPa, more preferably 3.5 MPa, still more preferably 3 MPa. If the lamination pressure is lower than 0.1 MPa, the adhesiveness between the microcapsules and two opposite electrode films may be decreased, so that the microcapsules are difficult to move in the data display layer and the microcapsules are difficult to be arranged approximately in a single layer, resulting in a decrease of contrast. To the contrary, if the lamination pressure is higher than 4 MPa, the microcapsules may remarkably be deformed and, in some cases, the microcapsules may be destructed, thereby making it impossible to obtain a practical display sheet.

The lamination temperature may preferably have a lower limit of room temperature (i.e., from 25° C. to 30° C.), more preferably 35° C., and still more preferably 40° C., and it may preferably have an upper limit of 120° C., more preferably 110° C., and still more preferably 100° C. If the lamination temperature is lower than room temperature, the adhesiveness between the microcapsules and two opposite electrode films may be decreased, so that the microcapsule may be difficult to move in the data display layer and the microcapsules may be difficult to be arranged approximately in a single layer, resulting in a decrease of contrast. To the contrary, if the lamination temperature is higher than 100° C., a solvent contained in the contents of the microcapsules may be expanded to leach out and, in some cases, the microcapsule may be destructed, thereby making it impossible to obtain a practical display sheet.

<<Electrophoretic Display Device>>

The display sheet of the present invention can be used, for example, as the constituent element of a data displaying part for electrophoretic display devices. The electrophoretic display device of the present invention comprises a data displaying part, wherein the data displaying part comprises the display sheet of the present invention. The electrophoretic display device of the present invention is the same as any of the heretofore known electrophoretic display devices, except that the data displaying part comprises the display sheet of the present invention. For this reason, parts other than the data displaying part, for example, a driving circuit and an electric power supply circuit, may be constructed in the same manner as in any of the heretofore known electrophoretic display devices. In other words, the electrophoretic display device of the present invention can be obtained by constructing the data displaying part in any of the heretofore known electrophoretic display devices with the display sheet of the present invention. In the present invention, the data displaying part alone may be referred to as an electrophoretic display device by incorporating the driving circuit and the electric power supply circuit into an external circuit.

As the electrophoretic display device of the present invention, an electrophoretic display device comprising, as the constituent element of a data displaying part, a display sheet obtained by laminating a layer containing the microcapsules and a binder resin between two opposed electrode films is preferably exemplified from the display sheets of the present invention. In such an electrophoretic display device, various constituent parts other than the display sheet (e.g., a driving circuit and an electric power supply circuit) may be those which are used in the heretofore known electrophoretic display devices, as described above.

The required display action in the electrophoretic display device of the present invention can be carried out by applying a controlled voltage to the opposed electrode films (e.g., applying a voltage only to the parts where desired images are to be displayed), thereby changing the oriented positions of electrophoretic particles in the microcapsules. If a driver layer including thin film transistors using amorphous silicon or polysilicon or organic transistors using organic molecules is formed in one electrode film, the display control can be carried out. Alternatively, without forming a driver layer, the display control may be carried out by an outer device. The means for display control may appropriately be selected depending upon the applications of the electrophoretic display device and is not particularly limited.

<<Electronic Equipments>>

The electrophoretic display device obtained using the display sheet of the present invention can be used, for example, as a data displaying means for electronic equipments. The electronic equipment of the present invention comprises a displaying means, wherein the data displaying means comprises the electrophoretic display device of the present invention. The "data displaying means" as used herein refers to a means for displaying character data, image data, and the like. The electronic equipment of the present invention is the same as any of the heretofore known electronic equipments, except that the data displaying means comprises the electrophoretic display device of the present invention. Therefore, parts other than the data displaying means may be the same as those of the heretofore known electronic equipments. That is, the electronic equipment of the present invention can be obtained by replacing the data displaying means in any of the heretofore known electronic equipments with the electrophoretic display device of the present invention.

The electronic equipment to which the electrophoretic display device of the present invention can be applied is not particularly limited, so long as the electronic equipment comprises a data displaying means. Examples of the electronic equipment may include personal computers, work stations, word processors, IC cards, IC tags, electronic notepads, electronic dictionaries, IC recorders, electronic books, electronic papers, electronic notebooks, electronic calculators, electronic newspapers, electronic white boards, direction boards, advertisement boards, various types of displays, TV sets, DVD players, digital still cameras, view finder-type or monitor direct view-type video cameras, car navigation systems, mobile phones, videophones, pagers, mobile terminals, POS terminals, and various kinds of equipments having touch panels. These electronic equipments have heretofore been known, and the electronic equipment of the present invention can be obtained by replacing their data displaying means with the electrophoretic display device of the present invention.

EXAMPLES

The present invention will be described below in detail by reference to Examples, but the present invention is not limited to these Examples. The present invention can be put into practice after appropriate modifications or variations within a range meeting the gists described above and later, all of which are included in the technical scope of the present invention.

First, the following will describe various methods of measurements.

<Particle Diameter of Electrophoretic Particles>

The particle diameter of the electrophoretic particles was measured as their volume-average particle diameter using a dynamic light scattering particle size analyzer (trade name: LB-500, available from Horiba, Ltd.).

<Particle Diameter of Microcapsules>

The particle diameter of the microcapsules was measured as their volume-average particle diameter using a laser scattering particle size distribution analyzer (trade name: LA-910, available from Horiba, Ltd.).

<Molecular Weight of Binder Resin>

The number-average molecular weight (Mn) and weight-average molecular weight (Mw) of the binder resin were determined by adding tetrahydrofuran (THF) to a binder resin solution to prepare a 0.2% by mass solution and measuring the solution in terms of polystyrene conversion using gel permeation chromatography (trade name: GPC System HLC-8120 GPC, available from Tosoh Corporation). The measurement conditions are as follows.

Measurement conditions:

Column: Connected column of trade names: TSKgel G5000HXL and TSKgel GMHXL-L (both available from Tosoh Corporation)

Column temperature: 40° C.

Sample injection amount: 200 μL

Eluent: Tetrahydrofuran

Feed amount: 1.0 mL/min.

Detector: Differential refractometer

<Glass Transition Temperature of Binder Resin>

A solution of the binder resin is applied onto a separator, followed by drying at 100° C. for 1 hour, to form a coated film of the binder resin. Using the formed coated film as a sample and using a dynamic viscoelasticity measuring apparatus (trade name: ARES, available from TA Instruments), a loss elastic modulus was measured under the following measurement conditions, and its peak value was regarded as a glass transition temperature (Tg)

Measurement conditions:

Geometry: Parallel plates (diameter, 8 mm)

Frequency: 1 Hz

Measurement temperature: from −60° C. to 100° C.

Rate of temperature increase: 5° C./min.

<Hydroxy Group Value of Binder Resin>

The hydroxy group value was measured by the following method in accordance with JIS K0070.

(Preparation of Sample)

A solution of the binder resin was taken on a dish made of an aluminum foil, and dried at 90° C. under a reduced pressure of 13 kPa for 24 hours to obtain a binder resin containing no solvent. The resulting binder resin was dissolved in ethyl acetate to form a sample for measuring the hydroxy group value.

(Preparation of Acetylating Regent)

Pyridine/acetic anhydride were uniformly mixed at a volume ratio of 100/30 to form an acetylating regent.

(Preparation of Aqueous Pyridine Solution)

Pyridine of the first reagent grade/ion-exchanged water were uniformly mixed at a volume ratio of 2/3 to form an aqueous pyridine solution.

(Preparation of KOH Methanol Solution)

About 70 g of potassium hydroxide (KOH) of the special reagent grade was taken, and about 50 mL of ion-exchanged water was added to dissolve potassium hydroxide therein, to which methanol of the first reagent grade was added to have a volume of about 1 L, followed by shaking to complete the dissolution. Carbon dioxide gas was shut out and, after allowing the solution to stand overnight, the supernatant was taken, and titrated with 1 mol/L hydrochloric acid having the known factor, to obtain a factor (i.e., "f" in the following equation).

(Titration)

First, 10 g of a sample was precisely weighed, to which 5 mL of the acetylating reagent was added with a whole pipette. The sample was completely dissolved, and the solution was immersed in an oil bath at 100° C.±2° C. for 60 minutes. After 5 mL of the aqueous pyridine solution was added with a whole pipette, followed by uniformly mixing, and the solution was immersed in an oil bath at 100° C. for 10 minutes. After the solution was cooled at room temperature, 40 mL of dioxane was added thereto. The mixture was uniformly mixed, to which from 2 to 3 droplets of a phenolphthalein indicator was added, followed by titration with the KOH methanol solution. The time point at which the color of the mixture turned pale red was regarded as the endpoint, and the titration amount (i.e., "C" in the following equation) was determined. For a blank to which no sample was added, the titration amount (i.e., "B" in the following equation) was also determined in the same manner.

(Calculation of Hydroxy Group Value)

The hydroxy group value was calculated by the following equation. The hydroxy group value is expressed by the mg number of potassium hydroxide equimolar to the hydroxy groups contained in 1 g of the nonvolatile content of the binder resin.

Hydroxy group value=$\{[(B-C) \times f \times 56.1]/(s \times N/100)\}+A$ where B is the titration amount (mL) of the blank; C is the titration amount (mL) of the sample; s is the amount (g) of the taken sample (10 g); f is a factor of the KOH methanol solution of 1 mol/L; A is the acid value (mg KOH/g) of the non-volatile content of the binder resin; and N is the non-volatile content (%) of the binder resin.

(Measurement of Acid Value)

First, 0.5 g of the binder resin was precisely weighed, and 50 g of toluene was added to uniformly dissolve the binder resin therein. As an indicator, from 2 to 3 droplets of a phenolphthalein/alcohol solution was added thereto, and the mixture was titrated with a 0.1 N potassium hydroxide/alcohol solution, and the time point at which redness of the solution disappeared in about 30 seconds was regarded as the endpoint. From the titration amount at this point and the non-volatile content of the binder resin, the acid value was calculated by the following equation. The acid value is expressed by the mg number of potassium hydroxide needed to neutralize 1 g of the non-volatile content of the binder resin.

Acid value=$\{[D \times f \times 5.61]/(s \times N/100)\}$ where D is the titration amount (mL) of the sample; s is the amount (g) of the taken sample (0.5 g); f is a factor of the KOH alcohol solution of 0.1 mol/L; and N is the non-volatile content (%) of the sample.

(Measurement of Non-Volatile Content)

The non-volatile content was measured by the following method in accordance with JIS K6833. First, 1.0 g of the binder resin (sample) was precisely weighed on a dish made of an aluminum foil, and dried using a hot air circulation-type constant temperature bath at 105° C. for from 60 to 180 minutes, followed by allowing the sample to stand for cooling in a desiccator. The mass of the binder resin (sample) after the drying was precisely weighed, and the non-volatile content was calculated by the following equation:

Non-volatile content(%)=$[(Wd)/(Ws)] \times 100$ where Wd is the mass (g) of the sample after the drying; and Ws is the mass (g) of the sample before the drying.

<Contrast>

A direct current voltage of 15 V was applied between both electrodes of a sheet for electrophoretic display devices (display part having a height of 5 cm and a width of 3 cm) for 0.4 seconds to carry out white display or black display, and the reflectance of each display was measured with a Macbeth spectroscopic densitometer (trade name: SpectroEye, available from GretagMacbeth), and the contrast (i.e., ratio of reflectance) was calculated by the following equation:

Contrast=reflectance of white display/reflectance of black display.

In this connection, the reflectance of white display and the reflectance of black display were separately measured by applying a voltage with changed polarity, and each reflectance is defined as an average of measurement values obtained for the entire one side face of the sheet for electrophoretic display devices.

<Storage Stability of Display Sheet>

A sheet for electrophoretic display devices was measured for contrast after storage for 30 days under an environment of 25° C. and 60% RH, and a difference between the contrast after the storage and the contrast before the storage was taken to evaluate the storage stability of the display sheet. That is, the amount of contrast change was determined as an absolute value by the following equation:

(Contrast change amount)=|(Contrast after storage)−(Contrast before storage)|, and when the amount of contrast change was not greater than 0.5, the display sheet was evaluated as A; when the amount of contrast change was greater than 0.5 and not greater than 1.0, the display sheet was evaluated as B; when the amount of contrast change was greater than 1.0 and not greater than 1.5, the display sheet was evaluated as C; and the amount of contrast change was greater than 1.5, the display sheet was evaluated as D.

The following will describe Preparation Examples of a dispersion for electrophoretic display devices and microcapsule pastes for electrophoretic display devices.

Preparation Example 1

Preparation of Dispersion (D-1) for Electrophoretic Display Devices

A 300-mL separable flask equipped with stirring blades, a thermometer, and a condenser tube was charged with 2 g of an acrylic polymer (having a weight-average molecular weight of 3,300) made of dodecyl methacrylate, 2-ethylhexyl acrylate, and glycidyl methacrylate (their relative proportion being 80:15:5), 20 g of carbon black (trade name: MA-100 R, available from Mitsubishi Chemical Corporation), and 78 g of Isoper M (available from ExxonMobil Chemical), and further charged with 800 g of zirconia beads having a diameter of 1 mm.

While the mixture was stirred at a rotation speed of 300 min$^{-1}$, a polymer grafting treatment was carried out by causing a reaction at 160° C. for 2 hours. After the treatment, further 100 g of Isoper M was added, and the mixture was sufficiently mixed. After that, the zirconia beads were separated to obtain 150 g of a dispersion with a solid content of 11% containing carbon black subjected to the polymer grafting treatment (the epoxy groups of the acrylic polymer were reacted here with the carboxyl groups existing on the surface of the carbon black). The volume-average particle diameter of electrophoretic particles contained in this dispersion was 0.2 µm.

On the other hand, a 300-mL separable flask equipped with stirring blades was charged with 50 g of titanium dioxide (trade name: Tipaque CR 90, available from Ishihara Sangyo Kaisha, Ltd.), 5 g of an acrylic polymer (having a weight-average molecular weight of 6,800) made of dodecyl methacrylate, 2-ethylhexyl acrylate, and γ-methacryloxypropyltrimethoxysilane (their relative proportion being 80:15:5), and 100 g of hexane, and the flask was put in an ultrasonic bath (trade name: BRANSON 5210, available from Yamato Kagaku Co., Ltd.) at 55° C., followed by ultrasonic dispersion treatment under stirring for 2 hours.

This separable flask was transferred to a hot water bath at 90° C., and the solvent was removed. The titanium dioxide which became in a powder state was taken out of the flask, transferred to a tray, and then heat treated in a dryer at 150° C. for 5 hours.

The titanium dioxide thus heat treated was dispersed in 100 g of hexane, and separated by centrifugation using a centrifugal separator, followed by washing. After this operation was repeated three times, the titanium dioxide was dried at 100° C.

A 300-mL separable flask was charged with 50 g of the titanium dioxide thus washing treated and 50 g of Isoper M, and the flask was put in an ultrasonic bath (trade name: BRANSON 5210, available from Yamato Kagaku Co., Ltd.) at 55° C., followed by ultrasonic dispersion treatment under stirring for 2 hours, to obtain a dispersion with a solid content of 50% containing titanium dioxide subjected to the polymer grafting treatment (the silyl groups of the acrylic polymer were reacted here with the hydroxy groups existing on the surface of the titanium dioxide). The volume-average particle diameter of electrophoretic particles contained in this dispersion was 0.5 μm.

A 200-mL mayonnaise bottle was charged with 6.0 g of the above dispersion of carbon black subjected to the polymer grafting treatment, 75 g of the above dispersion of titanium dioxide subjected to the polymer grafting treatment, and 19 g of Isoper M, and the content was sufficiently mixed to obtain the dispersion (D-1) for electrophoretic display devices, having electrophoretic particle concentrations of 0.66% for carbon black and 37.5% for titanium dioxide.

Preparation Example 2

Preparation of Microcapsule Paste (C-1) for Electrophoretic Display Devices

First, a 100-mL round-bottomed separable flask was charged with 8 g of melamine, 7 g of urea, 30 g of a 37% aqueous formaldehyde solution, and 3 g of 25% ammonia water, and the mixture was heated to 70° C. under stirring. After the mixture was kept at the same temperature for 2 hours, the mixture was cooled to 25° C. to obtain an aqueous solution (A-1) with a solid content of 54.6% containing a melamine-urea-formaldehyde preliminary condensation product.

Then, a 500-mL flat-bottomed separable flask was charged with 120 g of an aqueous solution containing 20 g of gum arabic dissolved therein, and 100 g of the dispersion (D-1) for electrophoretic display devices was added, while being stirred at 600 min$^{-1}$ using a disper (trade name: ROBOMICS, available from PRIMIX Corporation). After that, the stirring speed was changed to 1,600 min$^{-1}$, followed by stirring for 2 minutes, and the stirring speed was then changed to 1,000 min$^{-1}$, and 100 g of water was added to obtain a suspension.

This suspension was put in a 300-mL four-necked separable flask equipped with a thermometer and a condenser tube, and while being kept at 40° C. and being stirred by paddle blades, there was added 48 g of the aqueous solution (A-1) of the melamine-urea-formaldehyde preliminary condensation product. After 15 minutes, 100 g of an aqueous solution containing 2 g of L-cysteine dissolved therein was added dropwise by a dropping funnel over 5 minutes. While being kept at 40° C., the reaction was carried out for 4 hours, and the temperature was then increased to 50° C., and aging was carried out for 2 hours to obtain a dispersion of microcapsules each enclosing the dispersion for electrophoretic display devices in an inner shell made of a mercapto group-containing amino resin.

The microcapsule dispersion thus obtained was cooled to 25° C. and filtered with a standard sieve having meshes of 75 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

Then, water was added to the microcapsules to obtain 200 g of a dispersion, and the dispersion was transferred to the above flat-bottomed separable flask and heated to 40° C. under stirring.

To this microcapsule dispersion was added 100 g of an aqueous solution containing 15 g of polyglycerol polyglycidyl ether (trade name: Denacol EX-521 (having a weight-average molecular weight of 732 and a solubility in water of 100%), available from Nagase Chemtex Corporation), as an epoxy compound, dissolved therein. After 30 minutes, 50 g of an aqueous solution containing 2 g of sodium diethyldithiocarbamate dissolved therein was added dropwise by a dropping funnel over 5 minutes. While being kept at 40° C., the reaction was carried out for 3 hours, and the temperature was then increased to 50° C., and aging was carried out for 1 hour to obtain a dispersion of the microcapsules each enclosing the dispersion for electrophoretic display devices in a shell having an inner shell made of a mercapto group-containing amino resin and an outer shell made of an epoxy resin and formed on the outer surface of the inner shell.

The dispersion thus obtained was cooled to 25° C. and filtered with a standard sieve having meshes of 53 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

The volume-average particle diameter of the thus obtained microcapsules for electrophoretic display devices was 40.7 μm.

These microcapsules for electrophoretic display devices were suction-filtered to obtain the microcapsule paste (C-1) for electrophoretic display devices with a non-volatile content of 65%.

Preparation Example 3

Preparation of Microcapsule Paste (C-2) for Electrophoretic Display Device

A 500-mL flat-bottom separable flask was charged with 120 g of an aqueous solution containing 6 g of polyvinyl alcohol (trade name: KURARAY POVAL 205, available from KURARAY CO., LTD) dissolved therein, and while being stirred at 600 min$^{-1}$ using a disper (trade name: ROBOMICS, available from PRIMIX Corporation), there was added a solution obtained by preliminarily mixing 100 g of the dispersion (D-1) for electrophoretic display devices with a polymerizable composition in which 0.15 g of azobisisobutyronitrile was dissolved in 10 g of methyl methacrylate, 2 g of methacrylic acid, and 1 g of tetraethylene glycol diacrylate. After that, the stirring speed was changed to 1,300 min$^{-1}$, followed by stirring for 2 minutes, and the stirring speed was then changed to 1,000 min$^{-1}$, and 200 g of water was added to obtain a suspension.

This suspension was put in a 300-mL four-necked separable flask equipped with a thermometer and a condenser tube, in which nitrogen gas was allowed to flow, and while being kept at 70° C., the reaction was carried out for 5 hours to obtain a dispersion of microcapsules each enclosing the dispersion for electrophoretic display devices in a wall layer made of a (meth)acrylic resin.

The dispersion thus obtained was cooled to 25° C. and filtered with a standard sieve having meshes of 75 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

The volume-average particle diameter of the thus obtained microcapsules for electrophoretic display devices was 52.1 μm.

These microcapsules for electrophoretic display devices were suction-filtered to obtain the microcapsule paste (C-2) for electrophoretic display devices with a non-volatile content of 65%.

Preparation Example 4

Preparation of Microcapsule Paste (C-3) for Electrophoretic Display Device

A 500-mL flat-bottom separable flask was charged with 120 g of an aqueous solution containing 20 g of gum arabic dissolved therein, and while being stirred at 600 min$^{-1}$ using a disper (trade name: ROBOMICS, available from PRIMIX Corporation), there was added 100 g of the dispersion (D-1) for electrophoretic display devices. After that, the stirring speed was changed to 1,600 min$^{-1}$, followed by stirring for 2 minutes, and the stirring speed was then changed to 1,000 min$^{-1}$, and 100 g of water was added to obtain a suspension.

This suspension was put in a 300-mL four-necked separable flask equipped with a thermometer and a condenser tube, and while being kept at 40° C. and being stirred by paddle blades, there was added 48 g of the aqueous solution (A-1) of the melamine-urea-formaldehyde preliminary condensation product. While being kept at 40° C., the reaction was carried out for 4 hours, and the temperature was then increased to 50° C., and aging was carried out for 2 hours to obtain a dispersion of microcapsules each enclosing the dispersion for electrophoretic display devices in a wall layer made of a melamine resin.

The dispersion thus obtained was cooled to 25° C. and filtered with a standard sieve having meshes of 53 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

Then, water was added to the microcapsules to obtain 200 g of a dispersion, and the dispersion was transferred to the above flat-bottom separable flask and stirred.

To the microcapsule dispersion was added an aqueous solution (pH 10) obtained by dissolving 10 g of bisphenol S in a 1 N aqueous NaOH solution and adjusting the entire amount to be 200 g. After stirring for 30 minutes, the mixture was adjusted to pH 8.03 with a 10% aqueous citric acid solution, followed by further stirring for 1 hour, to partly precipitate bisphenol S on the microcapsules. Then, a dispersion containing 1 g of silica fine particles (trade name: Aerosil 90G, available from Aerosil Japan Ltd.) having an average particle diameter of 20 nm dispersed in 30 g of deionized water was added thereto, and the mixture was adjusted to pH 7 with a 10% aqueous citric acid solution to obtain a dispersion of microcapsules each enclosing the dispersion for electrophoretic display devices in a shell having a wall layer made of a melamine resin and a wall layer formed by the crystal growth of bisphenol S and the deposition of silica fine particles on the outer surface thereof.

The dispersion thus obtained was filtered with a standard sieve having meshes of 53 μm to remove coarse capsules having a diameter of 53 μm or greater. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

The volume-average particle diameter of the thus obtained microcapsules for electrophoretic display devices was 41.1 μm.

These microcapsules for electrophoretic display devices were suction-filtered to obtain the microcapsule paste (C-3) for electrophoretic display devices with a non-volatile content of 65%.

The following will describe Synthesis Examples of binder resins.

Synthesis Example 1

Synthesis of Binder Resin (P-1)

A 500-mL four-necked flask equipped with a stirring apparatus, a dropping port, a thermometer, a condenser tube, and a nitrogen gas introducing port was charged with 115 g of ethyl acetate, in which nitrogen gas was allowed to flow, and the flask was heated to an inner temperature of 78° C. under stirring. Then, a solution obtained by mixing 60 g of 2-hydroxyethyl acrylate, 140 g of n-butyl acrylate, and 4 g of 2,2'-azobis-(2,4-dimethylvaleronitrile) was added dropwise to the flask through the addition port over 120 minutes. Also after the dropwise addition, stirring was continued at the same temperature for 30 minutes, and 0.2 g of 2,2'-azobis(2,4-dimethylvaleronitrile) was then added three times every 30 minutes, followed by further heating for 150 minutes, to carry out copolymerization.

Then, 100 g of an ethyl acetate solution of the copolymer thus obtained was gradually added to 300 g of n-hexane to precipitate the copolymer. The precipitated polymer content was taken out, and the slightly remaining solvent was removed at 40° C. under a pressure of 6.7 KPa to obtain the binder resin (P-1) containing no solvent.

Further, 100 g of the binder resin (P-1) containing no solvent was dissolved in 67 g of ethanol to obtain a solution containing the binder resin (P-1) dissolved in ethanol.

The number-average molecular weight of the binder resin (P-1) was 20,800; the weight-average molecular weight of the binder resin (P-1) was 57,400; the glass transition temperature of the binder resin (P-1) was −25.8° C.; and the hydroxy group value of the binder resin (P-1) was 143.8 mg KOH/g. In addition, the non-volatile content of the ethanol solution obtained above was 60.2%.

Synthesis Example 2

Synthesis of Binder Resin (P-2)

An ethanol solution of the binder resin (P-2) was obtained in the same manner as described in Synthesis Example 1, except that the amount of 2,2'-azobis-(2,4-dimethylvaleronitrile) as the polymerization initiator added dropwise was changed to 1 g.

The number-average molecular weight of the binder resin (P-2) was 40,400; the weight-average molecular weight of the binder resin (P-2) was 152,200; the glass transition temperature of the binder resin (P-2) was −25.1° C.; and the hydroxy group value of the binder resin (P-2) was 142.7 mg KOH/g. The non-volatile content of the ethanol solution obtained above was 60.5%.

Synthesis Example 3

Synthesis of Binder Resin (P-3)

A 500-mL four-necked flask equipped with a stirring apparatus, a dropping port, a thermometer, a condenser tube, and a nitrogen gas introducing port was charged with 115 g of ethyl acetate, in which nitrogen gas was allowed to flow, and the flask was heated to an inner temperature of 78° C. under stirring. Then, a solution obtained by mixing 60 g of 2-hydroxyethyl acrylate, 130 g of n-butyl acrylate, 10 g of methyl methacrylate, and 1.5 g of 2,2'-azobis-(2,4-dimethylvaleronitrile) was added dropwise to the flask through the dropping port over 120 minutes. Also after the dropwise addition, stirring was continued at the same temperature for 30 minutes, and 0.2 g of 2,2'-azobis-(2,4-dimethylvaleronitrile) was then added three times every 30 minutes, followed by further heating for 150 minutes, to carry out copolymerization.

Then, 100 g of an ethyl acetate solution of the copolymer thus obtained was gradually added to 300 g of n-hexane to precipitate the copolymer. The precipitated polymer content was taken out, and the remaining solvent was removed at 40° C. under a pressure of 6.7 kPa to obtain the binder resin (P-3) containing no solvent.

Further, 100 g of the binder resin (P-3) containing no solvent was dissolved in 67 g of ethanol to obtain a solution containing the binder resin (P-3) dissolved in ethanol.

The number-average molecular weight of the binder resin (P-3) was 38,700; the weight-average molecular weight of the binder resin (P-3) was 99,300; the glass transition temperature of the binder resin (P-3) was −19.5° C.; and the hydroxy group value of the binder resin (P-3) was 142.3 mg KOH/g. In addition, the non-volatile content of the ethanol solution obtained above was 60.2%.

Synthesis Example 4

Synthesis of Binder Resin (P-4)

A 500-mL four-necked flask equipped with a stirring apparatus, a dropping port, a thermometer, a condenser tube, and a nitrogen gas introducing port was charged with 115 g of ethyl acetate, in which nitrogen gas was allowed to flow, and the flask was heated to an inner temperature of 78° C. under stirring. Then, a solution obtained by mixing 60 g of 2-hydroxyethyl acrylate, 140 g of 2-ethylhexyl acrylate, and 4 g of 2,2'-azobis(2,4-dimethylvaleronitrile) was added dropwise to the flask through the dropping port over 120 minutes. Also after the dropwise addition, stirring was continued at the same temperature for 30 minutes, and 0.2 g of 2,2'-azobis-(2,4-dimethylvaleronitrile) was then added three times every 30 minutes, followed by further heating for 150 minutes, to carry out copolymerization.

Then, 100 g of an ethyl acetate solution of the copolymer thus obtained was gradually added to 300 g of methanol to precipitate the copolymer. The precipitated polymer content was taken out, and the remaining solvent was removed at 40° C. under a pressure of 6.7 kPa to obtain the binder resin (P-4) containing no solvent.

Further, 100 g of the binder resin (P-4) containing no solvent was dissolved in 67 g of ethanol to obtain a solution containing the binder resin (P-4) dissolved in ethanol.

The number-average molecular weight of the binder resin (P-4) was 25,500; the weight-average molecular weight of the binder resin (P-4) was 55,700; the glass transition temperature of the binder resin (P-4) was −38.2° C.; and the hydroxy group value of the binder resin (P-4) was 141.8 mg KOH/g. In addition, the non-volatile content of the ethanol solution obtained above was 60.1%.

Synthesis Example 5

Synthesis of Binder Resin (P-5)

A 500-mL four-necked flask equipped with a stirring apparatus, a dropping port, a thermometer, a condenser tube, and a nitrogen gas introducing port was charged with 115 g of ethyl acetate, in which nitrogen gas was allowed to flow, and the flask was heated to an inner temperature of 78° C. under stirring. Then, a solution obtained by mixing 60 g of 2-hydroxyethyl acrylate, 85 g of n-butyl acrylate, 55 g of methyl methacrylate, and 1.5 g of 2,2'-azobis-(2,4-dimethylvaleronitrile) was added dropwise to the flask through the dropping port over 120 minutes. Also after the dropwise addition, stirring was continued at the same temperature for 30 minutes, and 0.2 g of 2,2'-azobis-(2,4-dimethylvaleronitrile) was then added three times every 30 minutes, followed by further heated for 150 minutes, to carry out copolymerization.

Then, 100 g of an ethyl acetate solution of the copolymer thus obtained was added to 300 g of n-hexane to precipitate the copolymer. The precipitated polymer content was taken out, and the remaining solvent was removed at 40° C. under a pressure of 6.7 kPa to obtain the binder resin (P-5) containing no solvent.

Further, 100 g of the binder resin (P-5) containing no solvent was dissolved in 67 g of ethanol to obtain a solution containing the binder resin (P-5) dissolved in ethanol.

The number-average molecular weight of the binder resin (P-5) was 37,200; the weight-average molecular weight of the binder resin (P-5) was 96,800; the glass transition temperature of the binder resin (P-5) was 4.8° C.; and the hydroxy group value of the binder resin (P-5) was 140.8 mg KOH/g. In addition, the non-volatile content of the ethanol solution obtained above was 60.4%.

Synthesis Example 6

Synthesis of Binder Resin (P-6)

An ethanol solution of the binder resin (P-6) was obtained in the same manner as described in Synthesis Example 1, except that the amount of 2,2'-azobis-(2,4-dimethylvaleronitrile) as the polymerization initiator added dropwise was changed to 0.7 g.

The number-average molecular weight of the binder resin (P-6) was 57,200; the weight-average molecular weight of the binder resin (P-6) was 266,600; the glass transition temperature of the binder resin (P-6) was −26.1° C.; and the hydroxy group value of the binder resin (P-6) was 141.3 mg KOH/g. In addition, the non-volatile content of the ethanol solution obtained above was 60.3%.

Synthesis Example 7

Synthesis of Binder Resin (P-7)

An ethanol solution of the binder resin (P-7) was obtained in the same manner as described in Synthesis Example 1, except that the amount of 2-hydroxyethyl acrylate was changed to 50 g, the amount of n-butyl acrylate was changed to 150 g, and the amount of 2,2'-azobis-(2,4-dimethylvaleronitrile) was changed to 0.7 g.

The number-average molecular weight of the binder resin (P-7) was 57,000; the weight-average molecular weight of the binder resin (P-7) was 229,200; the glass transition temperature of the binder resin (P-7) was −25.6° C.; and the hydroxy group value of the binder resin (P-7) was 118.7 mg KOH/g. In addition, the non-volatile content of the ethanol solution obtained above was 59.9%.

Synthesis Example 8

Synthesis of Binder Resin (P-8)

An ethanol solution of the binder resin (P-8) was obtained in the same manner as described in Synthesis Example 4, except that the amount of 2-hydroxyethyl acrylate was changed to 20 g and the amount of 2-ethylhexyl acrylate was changed to 180 g.

The number-average molecular weight of the binder resin (P-8) was 23,000; the weight-average molecular weight of the binder resin (P-8) was 47,500; the glass transition temperature of the binder resin (P-8) was −46.9° C.; and the hydroxy group value of the binder resin (P-8) was 48.1 mg KOH/g. The non-volatile content of the ethanol solution obtained above was 59.6%.

Synthesis Example 9

Synthesis of Binder Resin (P-9)

An ethanol solution of the binder resin (P-9) was obtained in the same manner as described in Synthesis Example 5, except that the amount of 2-hydroxyethyl acrylate was changed to 60 g, the amount of n-butyl acrylate was changed to 100 g, the amount of methyl methacrylate was changed to 40 g, and the amount of 2,2'-azobis(2,4-dimethylvaleronitrile) was changed to 5 g.

The number-average molecular weight of the binder resin (P-9) was 22,500; the weight-average molecular weight of the binder resin (P-9) was 41,500; the glass transition temperature of the binder resin (P-9) was −4.1° C.; and the hydroxy group value of the binder resin (P-9) was 143.7 mg KOH/g. In addition, the non-volatile content of the ethanol solution obtained above was 60.2%.

Synthesis Example 10

Synthesis of Binder Resin (P-10)

An ethanol solution of the binder resin (P-10) was obtained in the same manner as described in Synthesis Example 1, except that the amount of 2-hydroxyethyl acrylate was changed to 100 g and the amount of n-butyl acrylate was changed to 100 g.

The number-average molecular weight of the binder resin (P-10) was 22,200; the weight-average molecular weight of the binder resin (P-10) was 60,200; the glass transition temperature of the binder resin (P-10) was −20.1° C.; and the hydroxy group value of the binder resin (P-10) was 239.4 mg KOH/g. In addition, the non-volatile content of the ethanol solution obtained above was 60.4%.

Synthesis Example 11

Synthesis of Binder Resin (P-11)

An ethanol solution of the binder resin (P-11) was obtained in the same manner as described in Synthesis Example 1, except that the amount of 2-hydroxyethyl acrylate was changed to 140 g and the amount of n-butyl acrylate was changed to 60 g.

The number-average molecular weight of the binder resin (P-11) was 19,900; the weight-average molecular weight of the binder resin (P-11) was 74,000; the glass transition temperature of the binder resin (P-11) was −11.2° C.; and the hydroxy group value of the binder resin (P-11) was 335.9 mg KOH/g. In addition, the non-volatile content of the ethanol solution obtained above was 60.1%.

Synthesis Example 12

Synthesis of Binder Resin (P-12)

An ethanol solution of the binder resin (P-12) was obtained in the same manner as described in Synthesis Example 1, except that the amount of 2-hydroxyethyl acrylate was changed to 40 g, the amount of n-butyl acrylate was changed to 160 g, and the amount of 2,2'-azobis(2,4-dimethylvaleronitrile) was changed to 1 g.

The number-average molecular weight of the binder resin (P-12) was 70,600; the weight-average molecular weight of the binder resin (P-12) was 194,000; the glass transition temperature of the binder resin (P-12) was −34.2° C.; and the hydroxy group value of the binder resin (P-12) was 98.6 mg KOH/g. In addition, the non-volatile content of the ethanol solution obtained above was 59.8%.

Synthesis Example 13

Synthesis of Binder Resin (P-13)

An ethanol solution of the binder resin (P-13) was obtained in the same manner as described in Synthesis Example 1, except that the amount of 2-hydroxyethyl acrylate was changed to 160 g, the amount of n-butyl acrylate was changed to 40 g, and the amount of 2,2'-azobis(2,4-dimethylvaleronitrile) was changed to 8 g.

The number-average molecular weight of the binder resin (P-13) was 13,700; the weight-average molecular weight of the binder resin (P-13) was 57,300; the glass transition temperature of the binder resin (P-13) was −6.3° C.; and the hydroxy group value of the binder resin (P-13) was 385.1 mg KOH/g. In addition, the non-volatile content of the ethanol solution obtained above was 60.4%.

Synthesis Example 14

Synthesis of Binder Resin (CP-1)

An ethanol solution of the binder resin (CP-1) was obtained in the same manner as described in Synthesis Example 1, except that 60 g of 2-hydroxyethyl acrylate, 70 g of n-butyl acrylate, and 70 g of methyl methacrylate were used in place of 60 g of 2-hydroxyethyl acrylate, and 140 g of n-butyl acrylate as the polymerizable monomers added dropwise.

The number-average molecular weight of the binder resin (CP-1) was 23,400; the weight-average molecular weight of the binder resin (CP-1) was 47,600; the glass transition temperature was 15.5° C.; and the hydroxy group value of the binder resin (CP-1) was 142.7 mg KOH/g. In addition, the non-volatile content of the ethanol solution obtained above was 59.7%.

Synthesis Example 15

Synthesis of Binder Resin (CP-2)

An ethanol solution of the binder resin (CP-2) was obtained in the same manner as described in Synthesis Example 1, except that the amount of 2,2'-azobis-(2,4-dimethylvaleronitrile) as the polymerization initiator added dropwise was changed to 0.5 g.

The number-average molecular weight of the binder resin (CP-2) was 71,200; the weight-average molecular weight of the binder resin (CP-2) was 374,900; the glass transition temperature of the binder resin (CP-2) was −24.7° C.; and the hydroxy group value of the binder resin (CP-2) was 141.5 mg KOH/g. The non-volatile content of the ethanol solution obtained above was 59.9%.

Synthesis Example 16

Synthesis of Binder Resin (CP-3)

An ethanol solution of the binder resin (CP-3) was obtained in the same manner as described in Synthesis Example 1, except that 60 g of 2-hydroxyethyl acrylate, 105 g of n-butyl acrylate, and 35 g of methyl methacrylate were used in place of 60 g of 2-hydroxyethyl acrylate, and 140 g of n-butyl acrylate as the polymerizable monomers added dropwise.

The number-average molecular weight of the binder resin (CP-3) was 20,700; the weight-average molecular weight of the binder resin (CP-3) was 36,700; the glass transition temperature of the binder resin (CP-3) was −6.8° C.; and the hydroxy group value of the binder resin (CP-3) was 144.2 mg KOH/g. The non-volatile content of the ethanol solution obtained above was 60.3%.

The following will describe Production Examples of sheets for electrophoretic display devices.

Example 1

To 30 g of the microcapsule paste (C-1) for electrophoretic display devices, which was obtained in Preparation Example 2, was added 5 g of an ethanol solution of the binder resin (P-1), which was obtained in Synthesis Example 1, followed by mixing by a mixer (trade name Awatori Rentaro AR-100, available from Thinky Corporation) for 10 minutes, to obtain a coating solution.

This coating solution was applied to a PET film with an ITO electrode formed on a base material having a thickness of 125 μm (trade name: Highbeam CF98, available from Toray Industries, Inc.) by an applicator so that an uncoated part (i.e., an electrically conductive part) was left at least on one side, followed by drying at 90° C. for 10 minutes. Further, from this coated film, a coated part having a length of 5 cm and a width of 3 cm was cut in a state where an uncoated part was left on one side, and a PET film with an ITO electrode formed on a base material having a thickness of 75 μm (trade name: Highbeam CF98, available from Toray Industries, Inc.), which film had a length of 6 cm and a width of 4 cm, as an opposite electrode, was attached thereto (their arbitrary two points were fixed with a cellophane tape), and the attached sheet and film was placed on a glass plate having a thickness of 2 mm so that a lamination side became an upper roll side, and was laminated by allowing them to pass between two rolls, in which the surface temperature of the upper roll (i.e., the lamination temperature) was set at 60° C. and the pressure for pressing the upper roll against the lower roll (i.e., the lamination pressure) was set at 1 MPa, using a lamination apparatus attached to Multicoater TM-MC (available from Hirano Tecseed Co., Ltd.), thereby producing the sheet (S-1) for electrophoretic display devices.

The thus obtained sheet (S-1) for electrophoretic display devices was measured for contrast and storage stability. The results are shown in Table 1.

Examples 2 to 9

The sheets (S-2) to (S-9) for electrophoretic display devices were produced in the same manner as described in Example 1, except that each of binder resins (P-2) to (P-9) was used in place of the binder resin (P-1).

The thus obtained sheets (S-2) to (S-9) for electrophoretic display devices were measured for contrast and storage stability. The results are shown in Table 1.

Comparative Example 1

The sheet (CS-1) for electrophoretic display devices was produced in the same manner as described in Example 1, except that the binder resin (CP-1) was used in place of the binder resin (P-1).

The thus obtained sheet (CS-1) for electrophoretic display devices were measured for contrast and storage stability. The results are shown in Table 1.

Comparative Example 2

The sheet (CS-2) for electrophoretic display devices was produced in the same manner as described in Example 1, except that the binder resin (CP-2) was used in place of the binder resin (P-1).

The thus obtained sheet (CS-2) for electrophoretic display devices was measured for contrast and storage stability. The results are shown in Table 1.

Comparative Example 3

The sheet (CS-3) for electrophoretic display devices was produced in the same manner as described in Example 1, except that the binder resin (CP-3) was used in place of the binder resin (P-1).

The thus obtained sheet (CS-3) for electrophoretic display devices was measured for contrast and storage stability. The results are shown in Table 1.

TABLE 1

| | Micro-capsule paste | Binder resin | | | | | Sheet for electrophoretic display devices | | | |
|---|---|---|---|---|---|---|---|---|---|---|
| | | Type | Number-average molecular weight | Weight-average molecular weight | Glass transition temperature (°C.) | Hydroxy group value (mgKOH/g) | | Contrast | | Storage stability |
| | | | | | | | Type | Initial | After storage | |
| Example 1 | C-1 | P-1 | 20,800 | 57,400 | −25.8 | 143.8 | S-1 | 9.2 | 8.6 | B |
| Example 2 | C-1 | P-2 | 40,400 | 152,200 | −25.1 | 142.7 | S-2 | 8.8 | 9.2 | A |
| Example 3 | C-1 | P-3 | 38,700 | 99,300 | −19.5 | 142.3 | S-3 | 9.8 | 9.6 | A |
| Example 4 | C-1 | P-4 | 25,500 | 55,700 | −38.2 | 141.8 | S-4 | 9.3 | 8.4 | B |
| Example 5 | C-1 | P-5 | 37,200 | 96,800 | 4.8 | 140.8 | S-5 | 8.7 | 9.4 | B |
| Example 6 | C-1 | P-6 | 57,200 | 266,600 | −26.1 | 141.3 | S-6 | 8.2 | 7.5 | B |
| Example 7 | C-1 | P-7 | 57,000 | 229,200 | −25.6 | 118.7 | S-7 | 8.6 | 9.2 | B |
| Example 8 | C-1 | P-8 | 23,000 | 47,500 | −46.9 | 48.1 | S-8 | 8.9 | 8.2 | B |
| Example 9 | C-1 | P-9 | 22,500 | 41,500 | −4.1 | 143.7 | S-9 | 10.9 | 9.5 | C |
| Comparative Example 1 | C-1 | CP-1 | 23,400 | 47,600 | 15.5 | 142.7 | CS-1 | 4.2 | 2.8 | C |
| Comparative Example 2 | C-1 | CP-2 | 71,200 | 374,900 | −24.7 | 141.5 | CS-2 | 3.2 | 2.8 | A |
| Comparative Example 3 | C-1 | CP-3 | 20,700 | 36,700 | −6.8 | 144.2 | CS-3 | 10.5 | 6.6 | D |

As can be seen from Table 1, the sheets for electrophoretic display devices of Examples 1 to 9, in which the binder resins were used, each having a weight-average molecular weight of from 40,000 to 300,000 and a glass transition temperature of from −50° C. to 10° C., exhibited high initial contrast and also high contrast after storage for 30 days under an environment of 25° C. and 60% RH, and showed excellent storage stability.

In contrast, the sheet for electrophoretic display devices of Comparative Example 1, in which the binder resin was used, having a weight-average molecular weight in a prescribed range but being made of a polymer having a glass transition temperature of higher than 10° C., exhibited low initial contrast and also low contrast after storage for 30 days under an environment of 25° C. and 60% RH. In addition, the sheet for electrophoretic display devices of Comparative Example 2, in which the binder resin was used, having a glass transition temperature in a prescribed range but being made of a polymer having a weight-average molecular weight of higher than 300,000, exhibited low initial contrast and also low contrast after storage for 30 days under an environment of 25° C. and 60% RH. Further, the sheet for electrophoretic display devices of Comparative Example 3, in which the binder resin was used, having a glass transition temperature in a prescribed range but being made of a polymer having a weight-average molecular weight of lower than 40,000, exhibited high initial contrast, but exhibited low contrast after storage for 30 days under an environment of 25° C. and 60% RH and showed poor storage stability.

Thus, it can be understood that the use of a binder resin having a weight-average molecular weight of from 40,000 to 300,000 and a glass transition temperature of from −50° C. to 10° C. makes it possible to produce a sheet for electrophoretic display devices, exhibiting high initial contrast and showing a small variation of contrast with time.

Examples 10 to 13

The sheets (S-10) to (S-13) for electrophoretic display devices were produced in the same manner as described in Example 1, except that the binder resins (P-10) to (P-13) were used in place of the binder resin (P-1).

The thus obtained sheets (S-10) to (S-13) for electrophoretic display devices were measured for contrast and storage stability. The results are shown in Table 2.

Example 14

The sheet (S-14) for electrophoretic display devices was produced in the same manner as described in Example 10, except that the pressure for pressing the upper roll against the lower roll (i.e., the lamination pressure) was changed from 1 MPa to 2.5 MPa.

The thus obtained sheet (S-14) for electrophoretic display devices was measured for contrast and storage stability. The results are shown in Table 2.

Example 15

The sheet (S-15) for electrophoretic display devices was produced in the same manner as described in Example 10, except that the pressure for pressing the upper roll against the lower roll (i.e., the lamination pressure) was changed from 1 MPa to 3.5 MPa.

The thus obtained sheet (S-15) for electrophoretic display devices was measured for contrast and storage stability. The results are shown in Table 2.

Example 16

The sheet (S-16) for electrophoretic display devices was produced in the same manner as described in Example 10, except that the pressure for pressing the upper roll against the lower roll (i.e., the lamination pressure) was changed from 1 MPa to 0.2 MPa.

The thus obtained sheet (S-16) for electrophoretic display devices was measured for contrast and storage stability. The results are shown in Table 2.

Example 17

The sheet (S-17) for electrophoretic display devices was produced in the same manner as described in Example 10, except that the pressure for pressing the upper roll against the lower roll (i.e., the lamination pressure) was changed from 1 MPa to 0.15 MPa.

The thus obtained sheet (S-17) for electrophoretic display devices was measured for contrast and storage stability. The results are shown in Table 2.

Example 18

To 30 g of the microcapsule paste (C-1) for electrophoretic display devices, which was obtained in Preparation Example 2, was added 8 g of a water-based polyurethane resin (trade name: Superflex 470 (having a non-volatile content of 38% and a glass transition temperature of −30.3° C.), available from Dai-ichi Kogyo Seiyaku Co., Ltd.), followed by mixing by a mixer (trade name: Awatori Rentaro AR-100, available from Thinky Corporation) for 10 minutes, to obtain a coating solution.

This coating solution was applied to a PET film with an ITO electrode formed on a base material having a thickness of 125 μm (trade name: Highbeam CF98, available from Toray Industries, Inc.) by an applicator so that an uncoated part (i.e., an electrically conductive part) was left at least on one side, followed by drying at 90° C. for 10 minutes. Further, from this coated film, a coated part having a length of 5 cm and a width of 3 cm was cut in a state where an uncoated part was left on one side, and a PET film with an ITO electrode formed on a base material having a thickness of 75 μm (trade name: Highbeam CF98, available from Toray Industries, Inc.), which film had a length of 6 cm and a width of 4 cm, as an opposite electrode, was attached thereto (their arbitrary two points were fixed with a cellophane tape), and the attached sheet and film was placed on a glass plate having a thickness of 2 mm so that a lamination side became an upper roll side, and was laminated by allowing them to pass between two rolls, in which the surface temperature of the upper roll (i.e., the lamination temperature) was set at 60° C. and the pressure for pressing the upper roll against the lower roll (i.e., the lamination pressure) was set at 1 MPa, using a lamination apparatus attached to Multicoater TM-MC (available from Hirano Tecseed Co., Ltd.), thereby producing the sheet (S-18) for electrophoretic display devices.

The thus obtained sheet (S-18) for electrophoretic display devices was measured for contrast and storage stability. The results are shown in Table 2.

Examples 19 to 20

The sheets (S-19) to (S-20) for electrophoretic display devices were produced in the same manner as described in Example 10, except that the microcapsule pastes (C-2) to (C-3) for electrophoretic display devices were used in place of the microcapsule paste (C-1) for electrophoretic display devices.

The thus obtained sheets (S-19) to (S-20) for electrophoretic display devices were measured for contrast and storage stability. The results are shown in Table 2.

Comparative Example 4

The sheet (CS-4) for electrophoretic display devices was produced in the same manner as described in Example 10, except that the pressure for pressing the upper roll against the lower roll (i.e., the lamination pressure) was changed from 1 MPa to 5 MPa.

The thus obtained sheet (CS-4) for electrophoretic display devices was measured for contrast and storage stability. The results are shown in Table 2.

Comparative Example 5

The sheet (CS-5) for electrophoretic display devices was produced in the same manner as described in Example 10, except that the pressure for pressing the upper roll against the lower roll (i.e., the lamination pressure) was changed from 1 MPa to 0.05 MPa.

The thus obtained sheet (CS-5) for electrophoretic display devices was measured for contrast and storage stability. The results are shown in Table 2.

TABLE 2

| | | Binder resin | | | | | Sheet for electrophoretic display devices | | | |
|---|---|---|---|---|---|---|---|---|---|---|
| | Micro-capsule paste | Type | Number-average molecular weight | Weight-average molecular weight | Glass transition temperature (° C.) | Hydroxy group value (mgKOH/g) | Lamination pressure (MPa) | Type | Contrast Initial | Contrast After storage | Storage stability |
| Example 10 | C-1 | P-10 | 22,000 | 60,200 | −20.1 | 239.4 | 1 | S-10 | 10.6 | 10.2 | A |
| Example 11 | C-1 | P-11 | 19,900 | 74,000 | −11.2 | 335.9 | 1 | S-11 | 9.9 | 9.3 | B |
| Example 12 | C-1 | P-12 | 70,600 | 194,000 | −34.2 | 98.6 | 1 | S-12 | 9.0 | 8.3 | B |
| Example 13 | C-1 | P-13 | 13,700 | 57,300 | −6.3 | 385.1 | 1 | S-13 | 10.2 | 8.9 | C |
| Example 14 | C-1 | P-10 | 22,200 | 60,200 | −20.1 | 239.4 | 2.5 | S-14 | 10.3 | 10.1 | A |
| Example 15 | C-1 | P-10 | 22,200 | 60,200 | −20.1 | 239.4 | 3.5 | S-15 | 9.9 | 9.3 | B |
| Example 16 | C-1 | P-10 | 22,200 | 60,200 | −20.1 | 239.4 | 0.2 | S-16 | 10.2 | 9.7 | A |
| Example 17 | C-1 | P-10 | 22,200 | 60,200 | −20.1 | 239.4 | 0.15 | S-17 | 9.8 | 8.9 | B |
| Example 18 | C-1 | Super-flex 470 | 55,600 | 105,300 | −30.3 | 0 | 1 | S-18 | 8.7 | 7.5 | C |
| Example 19 | C-2 | P-10 | 22,200 | 60,200 | −20.1 | 239.4 | 1 | S-19 | 9.6 | 9.1 | A |
| Example 20 | C-3 | P-10 | 22,200 | 60,200 | −20.1 | 239.4 | 1 | S-20 | 9.1 | 8.4 | B |
| Comparative Example 4 | C-1 | P-10 | 22,200 | 60,200 | −20.1 | 239.4 | 5 | CS-4 | 6.3 | 4.9 | C |
| Comparative Example 5 | C-1 | P-10 | 22,200 | 60,200 | −20.1 | 239.4 | 0.05 | CS-5 | 4.8 | 2.2 | D |

As can be seen from Table 2, all of the sheets for electrophoretic display devices of Examples 10 to 13, in which the binder resins were used, having various hydroxy group values in a range of from 0 mg KOH/g to 400 mg KOH/g, the sheets for electrophoretic display devices of Examples 14 to 17, in which the lamination pressure was changed to various values of pressure in a range of from 0.1 MPa to 4 MPa, the sheet for electrophoretic display devices of Example 18, in which an urethane resin was used in place of a (meth)acrylic resin as the binder resin, the sheet for electrophoretic display devices of Example 19, in which single-layer microcapsules were used in place of double-layer microcapsules each having an inner shell made of a mercapto group-containing amino resin and an outer shell made of an epoxy resin, and the sheet for electrophoretic display devices of Example 20, in which there were used double-layer microcapsules each having a wall layer made of a melamine resin and a wall layer formed by the crystal growth of bisphenol S and the deposition of silica fine particles on the outer surface thereof, exhibited high initial contrast and also high contrast after storage for 30 days under an environment of 25° C. and 60% RH, and showed excellent storage stability.

In contrast, the sheets for electrophoretic display devices of Comparative Examples 4 and 5, in which the lamination pressure was out of a range of from 0.1 MPa to 4 MPa, exhibited low initial contrast and also low contrast after storage for 30 days under an environment of 25° C. and 60% RH.

Thus, it can be understood that the use of a binder resin having a weight-average molecular weight of from 40,000 to 300,000 and a glass transition temperature of from −50° C. to 10° C. makes it possible to produce a sheet for electrophoretic display devices, exhibiting high initial contrast and showing a small variation of contrast with time, even when the binder resin has any of various hydroxy group values in a range of from 0 mg KOH/g to 400 mg KOH/g, even when the lamination pressure has any of various values of pressure in a range of from 0.1 MPa to 4 MPa, even when a resin other than (meth)acrylic resins is used as the binder resin, and even when there are used various microcapsules other than double-layer microcapsules each having an inner shell made of a mercapto group-containing melamine resin and an outer resin made of an epoxy resin.

The following will describe Production Examples of electronic equipments using electrophoretic display devices.

Example 21

FIG. 1 is a plan view showing one example of an IC card which is one embodiment of the electronic equipment of the present invention. IC card 10 has two operation buttons 11 and 11, and display panel 12. In the IC card 10, display panel 12 as a data displaying means is the electrophoretic display device of the present invention.

Example 22

Figure 2:
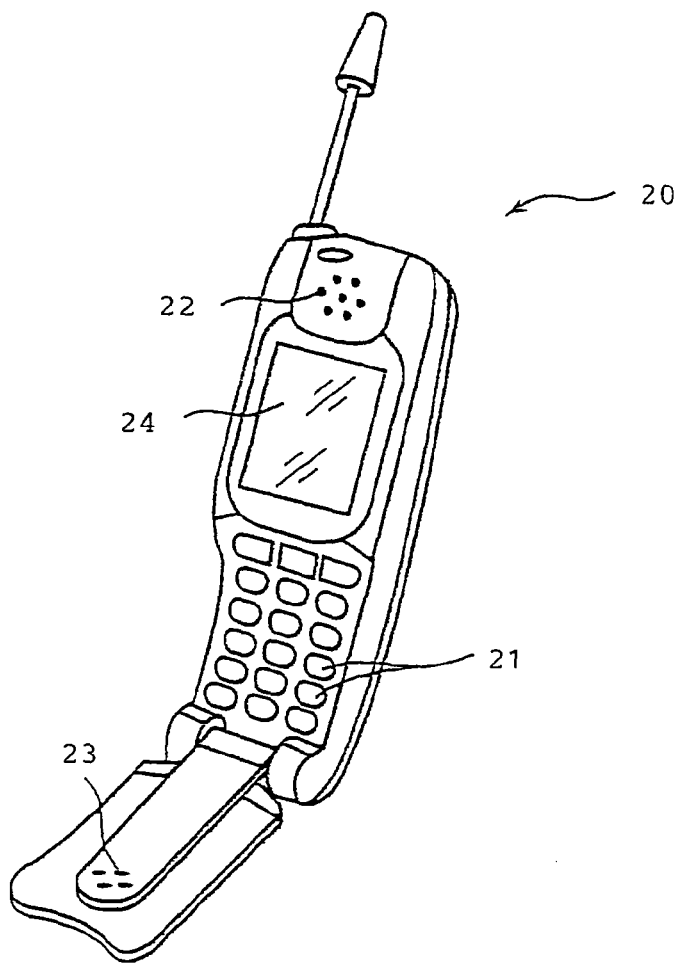
FIG. 2 is a perspective view showing one example of a mobile phone which is another embodiment of the electronic equipment of the present invention.

FIG. 2 is a perspective view showing one example of a mobile phone which is another embodiment of the electronic equipment of the present invention. Mobile phone 20 has two or more buttons 21, earpiece 22, mouthpiece 23, and display panel 24. In the mobile phone 20, display panel 24 as a data displaying means is the electrophoretic display device of the present invention.

Example 23

Figure 3:
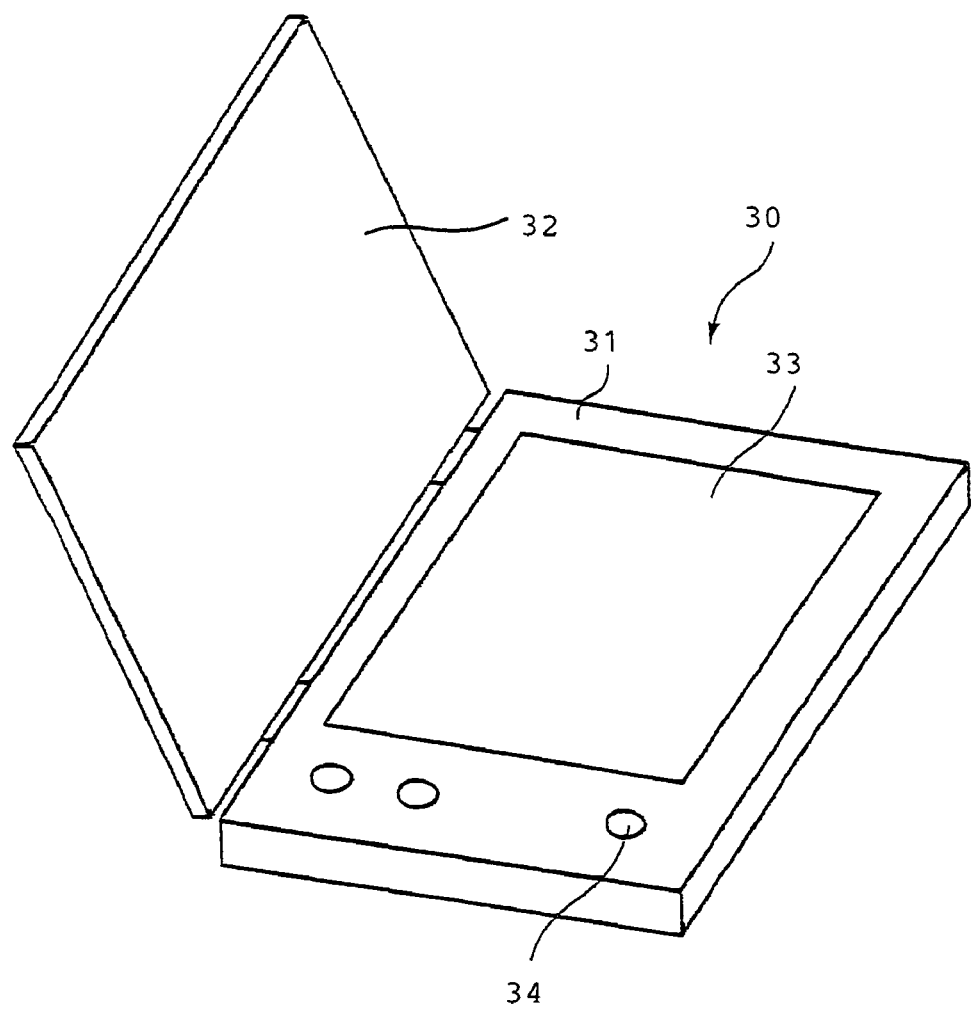
FIG. 3 is a perspective view showing one example of an electronic book which is still another embodiment of the electronic equipment of the present invention.

FIG. 3 is a perspective view showing one example of an electronic book which is still another embodiment of the electronic equipment of the present invention. Electronic book 30 has a book-shaped frame 31, and cover 32 which is provided rotatably relative to the frame 31 (openable and closable). Frame 31 has display device 33 in the state where the display surface is opened, and operating portion 34. In the electronic book 30, display device 33 as a data displaying means is the electrophoretic display device of the present invention.

Example 24

Figure 4:
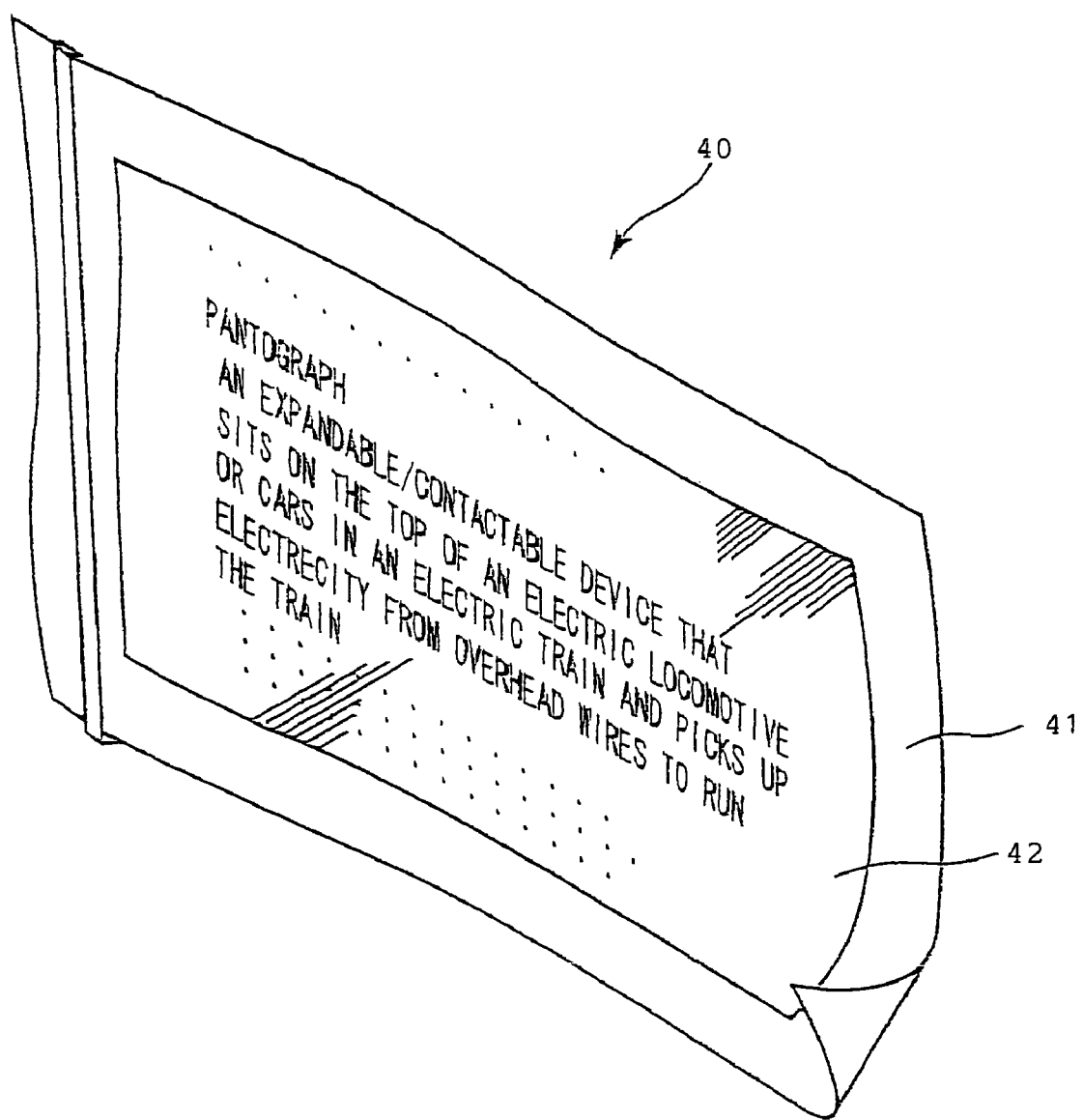
FIG. 4 is a perspective view showing one example of an electronic paper which is still another embodiment of the electronic equipment of the present invention.

FIG. 4 is a perspective view showing one example of an electronic paper which is still another embodiment of the electronic equipment of the present invention. Electronic paper 40 has body 41 formed of a re-writable sheet having the same texture and flexibility as those of a paper, and display unit 42. In the electronic paper 40, display unit 42 as a data displaying means is the electrophoretic display device of the present invention.

Each of the IC card of Example 21, the mobile phone of Example 22, the electronic book of Example 23, and the electronic paper of Example 24 comprises the electrophoretic display device of the present invention as the data displaying means, so that they are excellent in the display performance such as contrast.

The invention claimed is:

1. A sheet for electrophoretic display devices comprising:
    a pair of electrode films having electrically conductive layers; and
    a data display layer having microcapsules and a binder resin for binding the microcapsules in the data display layer,
    wherein the data display layer is positioned between the pair of electrode films,
    wherein the binder resin has a weight-average molecular weight of from 40,000 to 300,000 and a glass transition temperature of from −50° C. to 10° C.,
    wherein the binder resin comprises a hydroxy group-containing polymer, and
    wherein the binder resin has a hydroxy group value of from 0 mg KOH/g to 400 mg KOH/g.

2. The sheet for electrophoretic display devices according to claim 1, wherein the binder resin comprises a (meth)acrylic resin.

3. An electrophoretic display device comprising a data displaying part, wherein the data displaying part is the sheet for electrophoretic display devices according to claim 1.

4. An electronic apparatus comprising a data displaying means, wherein the data displaying means is the electrophoretic display according to claim 3.

5. A process for producing a sheet for electrophoretic display devices comprising:
    forming a data display layer on an electrically conductive layer of a first electrode film, the data display layer having microcapsules and a binder resin for binding the microcapsules in the data display layer, wherein the binder resin has a weight-average molecular weight of from 40,000 to 300,000 and a glass transition temperature of from −50° C. to 10° C.;
    arranging an electrically conductive layer of a second electrode film on the data display layer; and
    laminating the first electrode film, the data displaying layer, and the second electrode film,
    wherein the laminating is carried out by application of a pressure in a range of from 0.1 MPa to 4 MPa.

6. The process for producing a sheet for electrophoretic display devices according to claim 5, wherein the laminating is carried out by application of a pressure in a range of from 0.15 MPa to 4 MPa.

7. A sheet for electrophoretic display devices comprising:
a pair of electrode films having electrically conductive layers; and
a data display layer having microcapsules and a binder resin for binding the microcapsules in the data display layer,
wherein the data display layer is positioned between the pair of electrode films,
wherein the binder resin has a weight-average molecular weight of from 40,000 to 300,000 and a glass transition temperature of from −50° C. to 10° C.,
wherein the pair of electrode films includes a first electrode film and a second electrode film,
wherein an electrically conductive layer of the first electrode film is arranged on the data display layer, the data display layer being positioned on the second electrode film, and
wherein the first electrode film, the data displaying layer, and the second electrode film are laminated by application of a pressure in a range of from 0.1 MPa to 4 MPa.

8. The sheet for electrophoretic display devices according to claim 7, wherein the binder resin comprises a hydroxy group-containing polymer.

9. The sheet for electrophoretic display devices according to claim 7, wherein the binder resin has a hydroxy group value of from 0 mg KOH/g to 400 mg KOH/g.

10. The sheet for electrophoretic display devices according to claim 7, wherein the binder resin comprises a (meth)acrylic resin.

11. The sheet for electrophoretic display devices according to claim 7, wherein the first electrode film, the data displaying layer, and the second electrode film are laminated by application of a pressure in a range of from 0.15 MPa to 4 MPa.

* * * * *